(12) United States Patent
Abedini et al.

(10) Patent No.: US 10,349,403 B2
(45) Date of Patent: Jul. 9, 2019

(54) SUPPORTING DIFFERENT NUMEROLOGY CONFIGURATIONS

(71) Applicant: QUALCOMM Incorporated, San Diego, CA (US)

(72) Inventors: Navid Abedini, Raritan, NJ (US); Tao Luo, San Diego, CA (US); Sundar Subramanian, Bridgewater, NJ (US); Muhammad Nazmul Islam, Edison, NJ (US); Bilal Sadiq, Basking Ridge, NJ (US); Ashwin Sampath, Skillman, NJ (US); Juergen Cezanne, Ocean Township, NJ (US); Junyi Li, Chester, NJ (US); Krishna Kiran Mukkavilli, San Diego, CA (US); Durga Prasad Malladi, San Diego, CA (US); Ozge Koymen, Princeton, NJ (US); Atul Maharshi, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/461,108

(22) Filed: Mar. 16, 2017

(65) Prior Publication Data

US 2018/0063834 A1 Mar. 1, 2018

Related U.S. Application Data

(60) Provisional application No. 62/379,697, filed on Aug. 25, 2016.

(51) Int. Cl.
*H04W 72/04* (2009.01)
*H04W 24/02* (2009.01)
(Continued)

(52) U.S. Cl.
CPC ...... *H04W 72/0446* (2013.01); *H04B 7/0408* (2013.01); *H04L 5/0007* (2013.01);
(Continued)

(58) Field of Classification Search
None
See application file for complete search history.

(56) References Cited

U.S. PATENT DOCUMENTS

2007/0230394 A1* 10/2007 Wang ................ H04J 11/0069
370/328
2009/0092067 A1* 4/2009 Sudarshan ........... H04B 7/2656
370/281
(Continued)

FOREIGN PATENT DOCUMENTS

EP 2911321 A1 8/2015

OTHER PUBLICATIONS

Fujitsu: "TDD Frame Structure with Mixed Numerology," 3GPP Draft; R1-164331; 3rd generation Partnership project (3GPP), Mobile Competence Centre; 650, Route Des Lucioles; F-06921 Sophia-Antipolis Cedex; France; vol. RAN WG1, No. Nanjing, China; May 23, 2016-May 27, 2016; May 13, 2016 (May 13, 2016), 5 pages, XP051090160, Retrieved from the Internet: URL:http://www.3gpp.org/ftp/tsg_ran/WG1_RL1/TSGR1_85/Docs/ [retrieved on May 13, 2016].
(Continued)

*Primary Examiner* — Robert M Morlan
(74) *Attorney, Agent, or Firm* — Arent Fox LLP

(57) ABSTRACT

In wireless communication systems that support 5G or NR protocols, subframes used for communication may have different numerology options. Numerology options may refer to the characteristics of the subframe such as a tone spacing within each symbol of the subframe, a symbol duration for each symbol of the subframe, a number of
(Continued)

symbols in the subframe, etc. A subframe may include a control channel (e.g., the PDCCH) and a data channel (e.g., the PDSCH). In an aspect, the control channel and the data channel within the subframe may have different numerologies. As such, a need exists to signal the numerology of the subframe to users and to determine whether and how to multiplex the control channel and the data channel into the subframe.

29 Claims, 14 Drawing Sheets

(51) Int. Cl.
*H04B 7/0408* (2017.01)
*H04L 5/00* (2006.01)
*H04L 27/26* (2006.01)

(52) U.S. Cl.
CPC .......... *H04L 5/0096* (2013.01); *H04W 24/02* (2013.01); *H04W 72/042* (2013.01); *H04L 5/0042* (2013.01); *H04L 27/2602* (2013.01)

(56) References Cited

U.S. PATENT DOCUMENTS

| | | | |
|---|---|---|---|
| 2009/0185476 | A1 | 7/2009 | Tsai et al. |
| 2009/0185632 | A1* | 7/2009 | Cai ............. H04L 5/0044 375/260 |
| 2010/0214969 | A1 | 8/2010 | Lamm et al. |
| 2013/0010709 | A1* | 1/2013 | Earnshaw ......... H04L 5/001 370/329 |
| 2013/0294317 | A1* | 11/2013 | Malladi ............. H04W 4/06 370/312 |
| 2014/0003301 | A1 | 1/2014 | Madan et al. |
| 2014/0169327 | A1 | 6/2014 | Chun et al. |
| 2015/0349979 | A1 | 12/2015 | Ji et al. |
| 2015/0365263 | A1 | 12/2015 | Zhang et al. |
| 2016/0294521 | A1* | 10/2016 | Au .................. H04L 5/0007 |
| 2017/0055285 | A1 | 2/2017 | Valliappan et al. |
| 2017/0134199 | A1 | 5/2017 | Wang et al. |
| 2017/0223687 | A1 | 8/2017 | Kuchibhotla et al. |
| 2017/0230954 | A1 | 8/2017 | Au et al. |
| 2017/0289992 | A1 | 10/2017 | Sun et al. |
| 2017/0295000 | A1 | 10/2017 | Yoo et al. |
| 2017/0311315 | A1 | 10/2017 | Islam et al. |
| 2017/0325256 | A1 | 11/2017 | Islam et al. |
| 2017/0374652 | A1 | 12/2017 | Islam et al. |
| 2018/0007673 | A1 | 1/2018 | Fwu et al. |
| 2018/0063835 | A1 | 3/2018 | Abedini et al. |

OTHER PUBLICATIONS

Huawei., et al., "Overview of 5G frame structure," 3rd Generation Partnership Project (3GPP); 3GPP Draft;.R1-162157, Mobile Competence Centre ; 650, Route Des Lucioles ; F-06921 Sophia-Antipolis Cedex; France; vol. RAN WG1, No. Busan, Korea; Apr. 11, 2016-Apr. 15, 2016; Apr. 2, 2016 (Apr. 2, 2016), XP051080003, pp. 6. Retrieved from the Internet: URL: http://www.3gpp.org/ftp/tsg_ran/WG1_RL1/TSGR1_84b/Docs/ [retrieved on Apr. 2, 2016].
Huawei., et al., "Overview of Frame Structure for NR," 3GPP Draft; R1-166102, 3rd Generation Partnership Project (3GPP), Mobile Competence Centre; 650, Route Des Lucioles; F-06921 Sophia-Antipolis Cedex; France; vol. RAN WG1, No. Gothenburg, Sweden; Aug. 22, 2016-Aug. 26, 2016; Aug. 21, 2016 (Aug. 21, 2016), 8 pages, XP051140062, Retrieved from the Internet: URL:http://www.3gpp.org/ftp/Meetings_3GPP_SYNC/RAN1/Docs/ [retrieved on Aug. 21, 2016] the whole document.
Intel Corporation: "Frame Structure Design for NR," 3GPP Draft; R1-166555; 3rd Generation Partnership Project (3GPP), Mobile Competence Centre; 650, Route Des Lucioles; F-06921; Sophia-Antipolis Cedex; France; vol. RAN WG1, No. Gothenburg, Sweden; Aug. 22, 2016-Aug. 26, 2016; Aug. 21, 2016 (Aug. 21, 2016), 8 pages, XP051125447, Retrieved from the Internet: URL:http://www.3gpp.org/ftp/Meetings_3GPP_SYNC/RAN1/Docs/ [retrieved on Aug. 21, 2016].
Interdigital Communications: "UE Support for Multiple Numerologies with NR", 3GPP Draft; R1-167328, 3rd Generation Partnership Project (3GPP), Mobile Competence Centre; 650, Route Des Lucioles; F-06921 Sophia-AntiPolis Cedex; France, vol. RAN WG1, No. Goteborg; Aug. 21, 2016, XP051125847, Retrieved from the Internet: URL:http://www.3gpp.org/ftp/Meetings_3GPP_SYNC/RAN1/Docs/ [retrieved on Aug. 21, 2016], 4 pages.
International Search Report and Written Opinion—PCT/US2017/048268—ISA/EPO—dated Nov. 10, 2017.
LG Electronics: "Handling URLLC in New RAT," 3GPP Draft; R1-166886; 3rd Generation Partnership Project (3GPP), Mobile Competence Centre; 650, route des Lucioles; F-06921 Sophia-Antipolis Cedex; France; vol. RAN. WG1, No. Gothenburg, Sweden; Aug. 22, 2016-Aug. 26, 2016; Aug. 21, 2016 (Aug. 21, 2016), 5 pages, XP051125623, Retrieved from the Internet:URL:http://www.3gpp.org/ftp/Meetings_3GPP_SYNC/RAN1/Docs/ [retrieved on Aug. 21, 2016].

\* cited by examiner

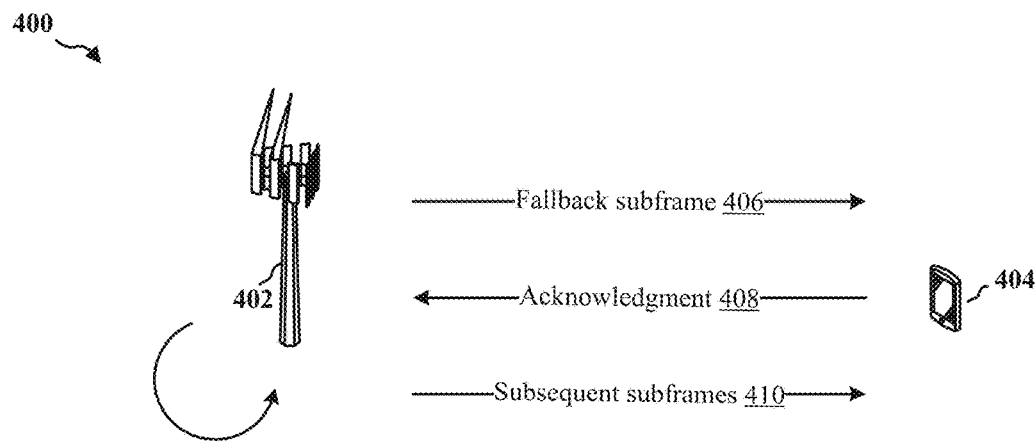
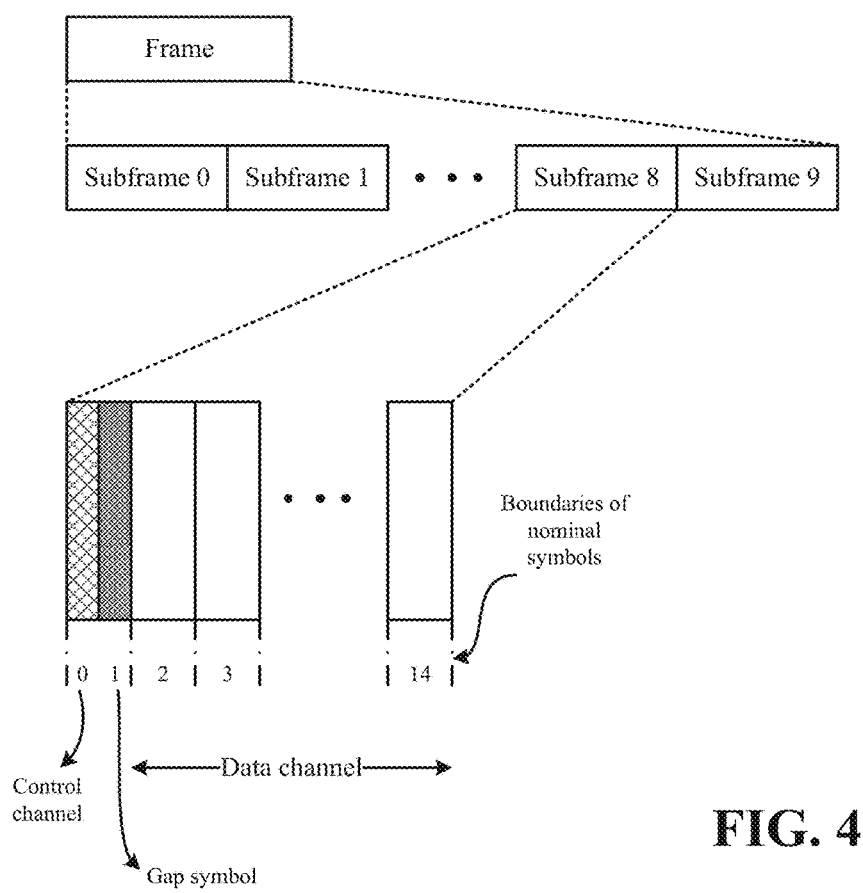
FIG. 4

SUPPORTING DIFFERENT NUMEROLOGY CONFIGURATIONS

CROSS-REFERENCE TO RELATED APPLICATION(S)

This application claims the benefit of U.S. Provisional Application Ser. No. 62/379,697, entitled "SUPPORTING DIFFERENT NUMEROLOGY CONFIGURATIONS" and filed on Aug. 25, 2016, which is expressly incorporated by reference herein in its entirety.

BACKGROUND

Field

The present disclosure relates generally to communication systems, and more particularly, to a network supporting different numerology configurations and employing transmission gaps.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE and other communication technologies. These improvements may also be applicable to other multi-access technologies and the telecommunication standards that employ these technologies.

5G (or new radio (NR)) systems may support different numerology options within a subframe. New designs and signaling are needed to support the numerology options.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Networks that support 5G communication may support different numerology options across and even within a subframe. For example, two different subframes may have different tone spacing. Base stations and user equipments, however, may have existing assumptions about the type of tone spacing within each symbol. As such, if the tone spacing is to change, signaling is needed to support the changes in tone spacing and other numerology changes. As further discussed below, base stations may utilize a first type of subframe with a known numerology configuration to transmit information to user equipment indicating the numerology configuration to be used for subsequent subframes. When the user equipment receives the first type of subframes, the user equipment will decode the subframe and become aware of the numerology configurations to be used for future communications with the base station.

In an aspect of the disclosure, a method, a computer-readable medium, and an apparatus are provided. In an aspect, an apparatus within the network may be configured to determine a numerology configuration to be used for communication with user equipment. The apparatus may determine one or more fallback subframes and communicate with the user equipment within the one or more fallback subframes based on the determined numerology configuration.

Another aspect of the disclosure provides for an apparatus for wireless communication. The apparatus may include means for determining a numerology configuration to be used for communicating with a UE, means for determining one or more fallback subframes, and means for communicating with the UE within the one or more fallback subframes based on the determined numerology configuration.

Another aspect of the disclosure provides for a computer-readable medium storing computer executable code. The computer-readable medium includes code to determine a numerology configuration to be used for communicating with a UE, to determine one or more fallback subframes, and to communicate with the UE within the one or more fallback subframes based on the determined numerology configuration.

In another aspect of the disclosure, a method, a computer-readable medium, and an apparatus are provided. The apparatus may determine a nominal numerology and a numerology configuration to be used for a subframe. The numerology configuration may include a first tone spacing in the subframe for a control channel and a second tone spacing in the subframe for a data channel. The apparatus may transmit the subframe to a user equipment.

Another aspect of the disclosure provides a method of wireless communication by a base station. The method includes determining a nominal numerology and a numerology configuration to be used for a subframe. The numerology configuration may include a first tone spacing in the subframe for a control channel and a second tone spacing in the subframe for a data channel. The method includes transmitting the subframe to a UE. In an aspect, the first tone spacing may be the same as the second tone spacing. In another aspect, the first tone spacing may be different from the second tone spacing. In another aspect, the first tone spacing may be an integer multiple of the second tone spacing. In another aspect, the first tone spacing may be a first integer multiple of a tone spacing of the nominal numerology and the second tone spacing may be a second integer multiple of the tone spacing of the nominal numerology. In another configuration, the method may include determining whether to TDM the control channel with the data channel into adjacent symbols based on the determined numerology configuration of the subframe. In another aspect, the base station determines not to TDM the control channel with the data channel into adjacent symbols if the adjacent symbols have different tone spacings and the transmission of the two adjacent symbols will overlap with symbol boundaries corresponding to the nominal numerology. In another aspect, the subframe may include one or more gap symbols between the transmission of the control channel and the data channel. In another aspect, the one or more gap symbols may include reference signals or L1 control signals. In another aspect, the one or more gap symbols may use a same tone spacing as the control channel or may use a different tone spacing from the control channel. In another aspect, the first tone spacing of the control channel may be an integer multiple of the second tone spacing of the data channel, and the one or more gap symbols may have the first tone spacing.

Another aspect of the disclosure provides for an apparatus. The apparatus includes means for determining one or more fallback subframes and determine a numerology configuration to be used for communication with a base station within the one or more fallback subframes and means for communicating within the one or more fallback subframes based on the determined numerology configuration.

Another aspect of the disclosure provides for an apparatus for wireless communication. The apparatus includes a memory and at least one processor. The at least one processor may be coupled to the memory and configured to determine one or more fallback subframes and determine a numerology configuration to be used for communication with a base station within the one or more fallback subframes and to communicate within the one or more fallback subframes based on the determined numerology configuration.

Another aspect of the disclosure provides for a computer-readable medium. The computer-readable medium may include computer executable code, including code to determine one or more fallback subframes and determine a numerology configuration to be used for communication with a base station within the one or more fallback subframes and to communicate within the one or more fallback subframes based on the determined numerology configuration.

In another aspect of the disclosure, a method, a computer-readable medium, and an apparatus are provided. The apparatus may determine one or more fallback subframes and determine a numerology configuration to be used for communication with a base station within the one or more fallback subframes. The apparatus may communicate within the one or more fallback subframes based on the determined numerology configuration.

Another aspect of the disclosure provides an apparatus for wireless communication. The apparatus may include means for determining one or more fallback subframes, means for determining a numerology configuration to be used for communication with a base station within the one or more fallback subframes, and means for communicating within the one or more fallback subframes based on the determined numerology configuration.

Another aspect of the disclosure provides a computer-readable medium storing computer executable code. The computer-readable medium includes code to determine one or more fallback subframes, to determine a numerology configuration to be used for communication with a base station within the one or more fallback subframes, and to communicate within the one or more fallback subframes based on the determined numerology configuration.

In yet another aspect of the disclosure, a method, a computer-readable medium, and an apparatus are provided. The apparatus may receive from a base station a subframe associated with a numerology configuration. The numerology configuration may be associated with a first tone spacing in the subframe for a control channel and a second tone spacing in the subframe for a data channel. The apparatus may decode the received subframe based on the numerology configuration.

Another aspect of the disclosure provides for a method of wireless communication by a UE. The method may include receiving from a base station a subframe associated with a numerology configuration, in which the numerology configuration is associated with a first tone spacing in the subframe for a control channel and a second tone spacing in the subframe for a data channel, and decoding the received subframe based on the numerology configuration. In an aspect, the first tone spacing may be the same as the second tone spacing. In another aspect, the first tone spacing may be different from the second tone spacing. In another aspect, the first tone spacing may be an integer multiple of the second tone spacing. In another aspect, the first tone spacing may be a first integer multiple of a tone spacing of a nominal numerology and the second tone spacing may be a second integer multiple of the tone spacing of a nominal numerology. In another aspect, the subframe may include one or more gap symbols between the transmission of the control channel and the data channel. In another aspect, the one or more gap symbols may include reference signals or L control signals. In another aspect, the one or more gap symbols may use a same tone spacing as the control channel or may use a different tone spacing from the control channel. In another aspect, a first tone spacing of the control channel may be an integer multiple of a second tone spacing of the data channel, and the one or more gap symbols may have the first tone spacing.

Another aspect of the disclosure provides for an apparatus for wireless communication. The apparatus may include means for receiving from a base station a subframe associated with a numerology configuration. The numerology configuration may be associated with a first tone spacing in the subframe for a control channel and a second tone spacing in the subframe for a data channel. The apparatus may include means for decoding the received subframe based on the numerology configuration.

Another aspect of the disclosure provides for an apparatus for wireless communication. The apparatus may include a memory and at least one processor coupled to the memory. The at least one processor may be configured to receive from a base station a subframe associated with a numerology configuration. The numerology configuration may be associated with a first tone spacing in the subframe for a control channel and a second tone spacing in the subframe for a data channel. The at least one processor may be configured to decode the received subframe based on the numerology configuration.

Another aspect of the disclosure provides for a computer-readable medium. The computer readable medium may store computer executable code, including code to receive from a base station a subframe associated with a numerology configuration. The numerology configuration may be associated with a first tone spacing in the subframe for a control channel and a second tone spacing in the subframe for a data channel. The computer-readable medium may also include code to decode the received subframe based on the numerology configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram of a method for indicating a numerology configuration.

DETAILED DESCRIPTION

Figure 1:
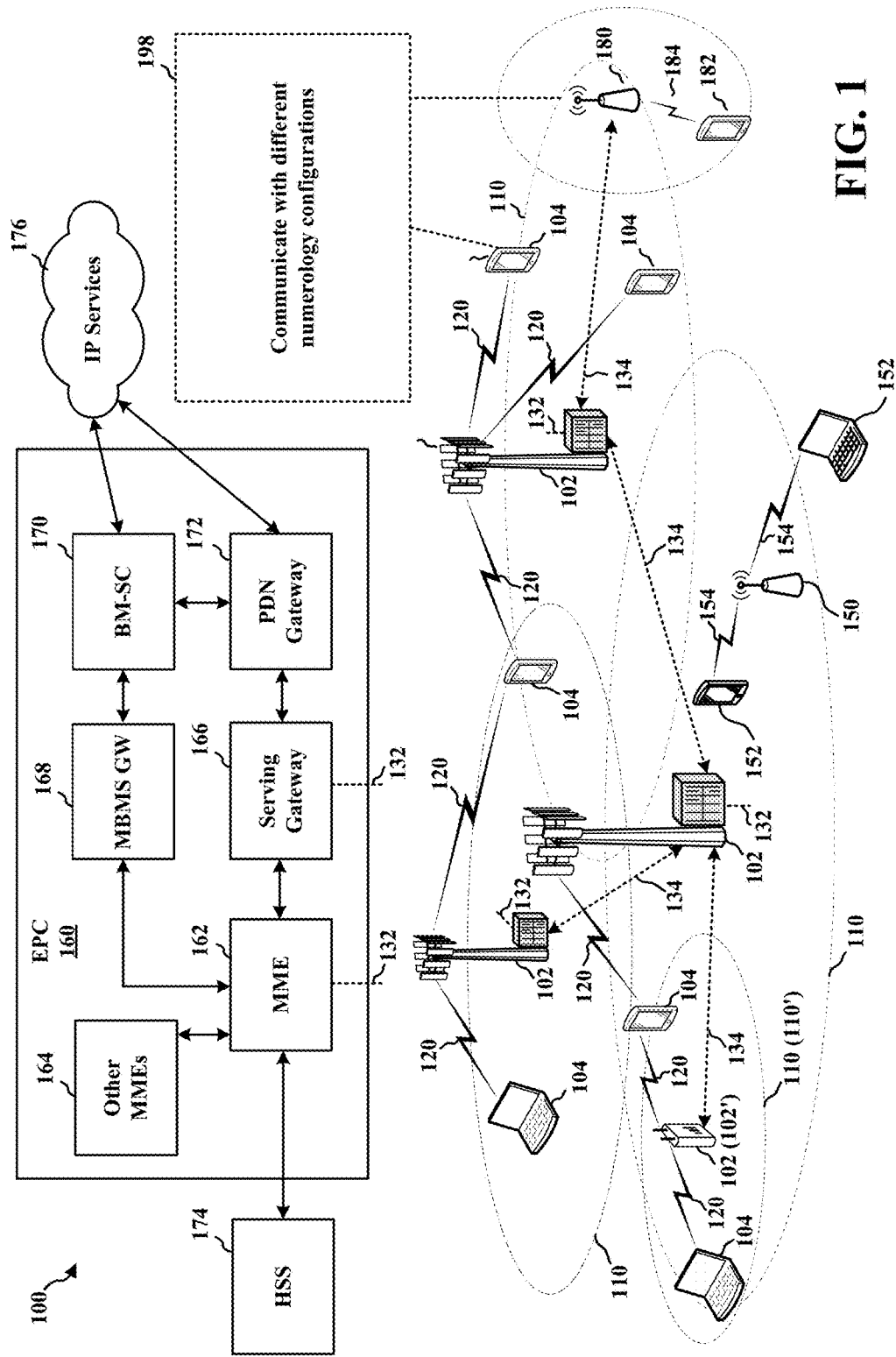
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104, base station 102, and/or the mmW base station 180 may be configured to communicate with different numerology configurations and/or with transmission gaps within a subframe (198).

Figure 2:
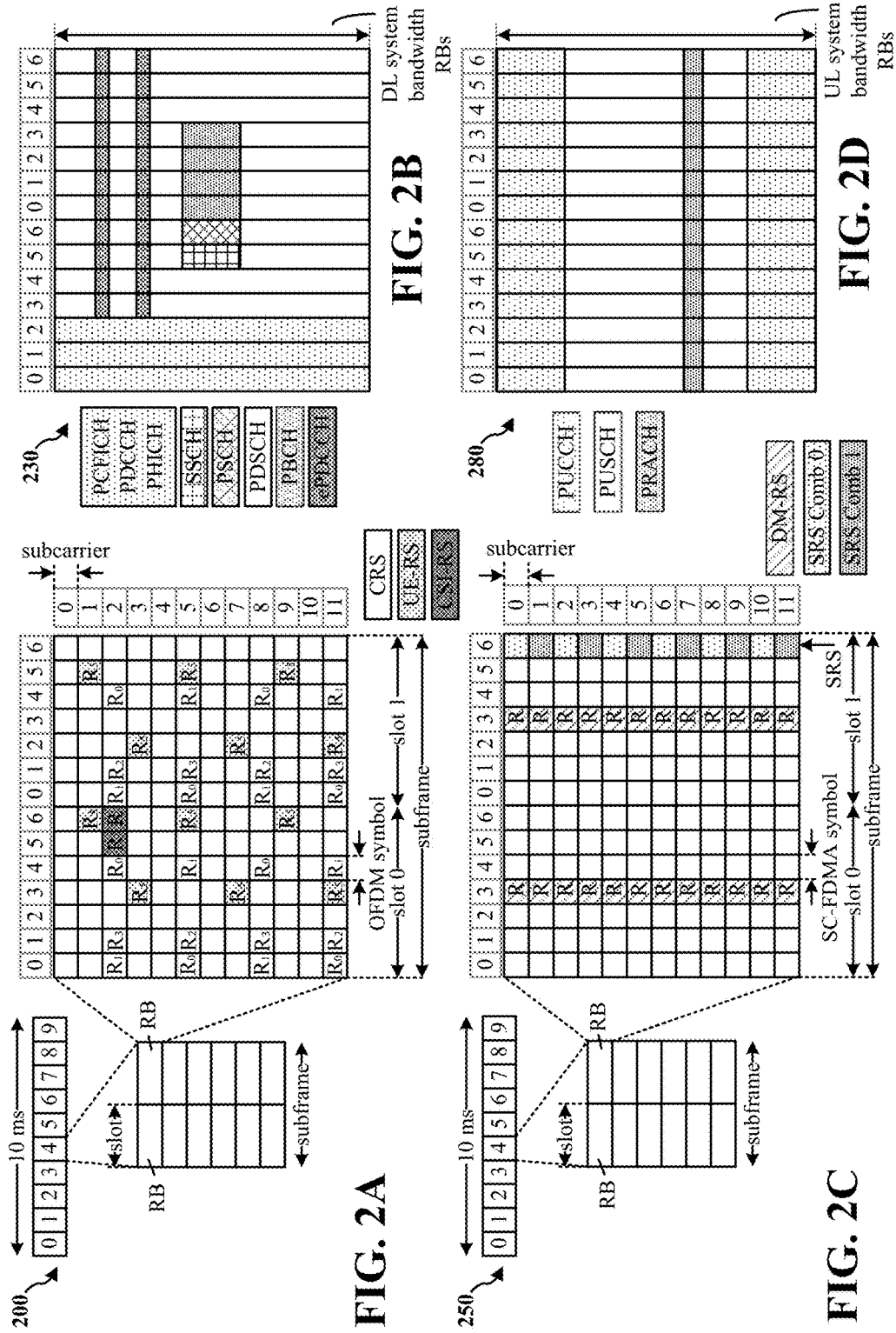
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
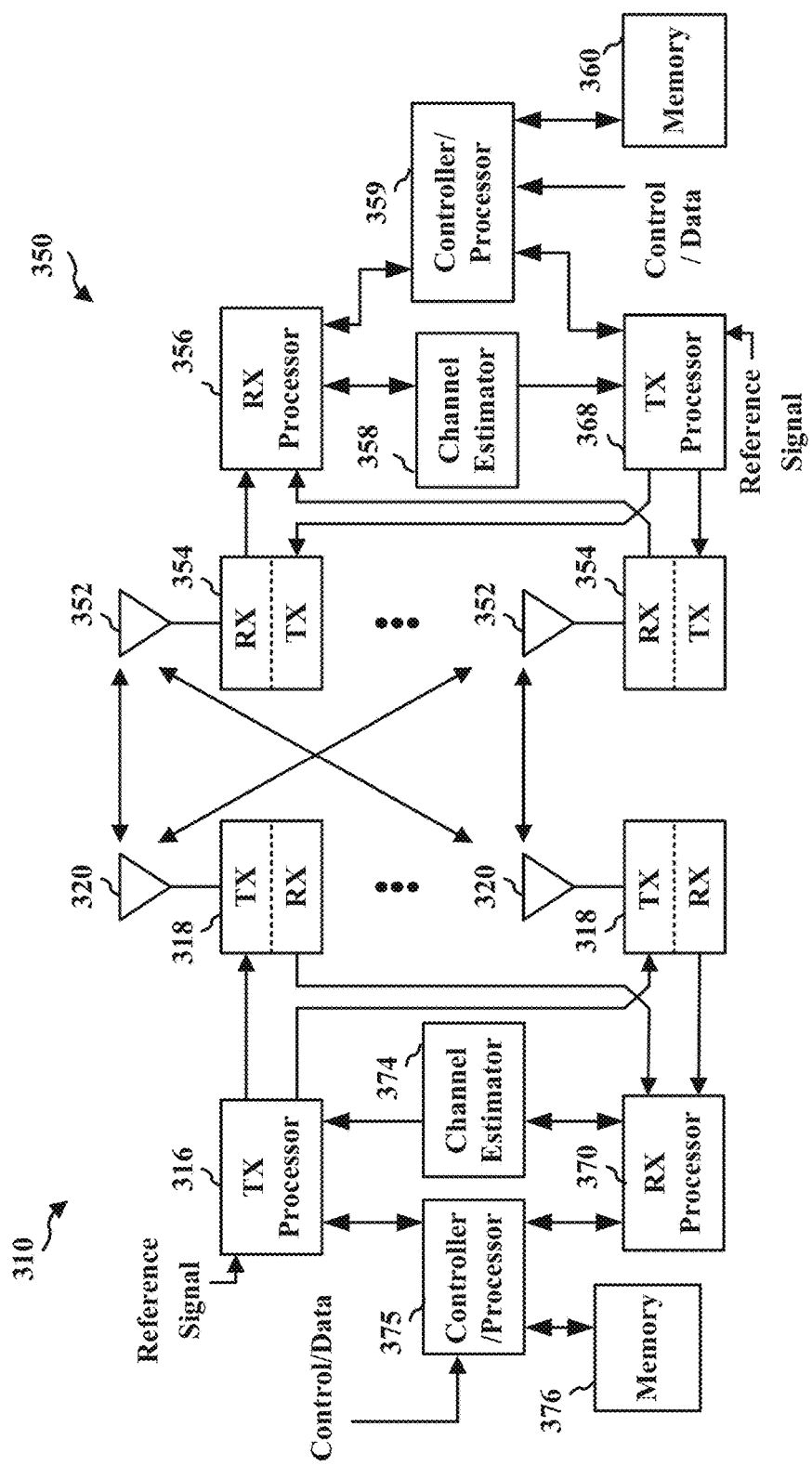
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In wireless communication systems that support 5G or NR protocols, subframes used for communication may have different numerology options. Numerology options may refer to the characteristics of the subframe such as a tone spacing within each symbol of the subframe, a symbol duration for each symbol of the subframe, a number of symbols in the subframe, etc. As discussed above, a subframe may include a control channel (e.g., the PDCCH) and a data channel (e.g., the PDSCH). In an aspect, the control channel and the data channel within the subframe may have different numerologies. As such, a need exists to signal the numerology of the subframe to users and to determine whether and how to multiplex the control channel and the data channel into the subframe.

FIG. 4 is a diagram 400 of a method for indicating a numerology configuration. Referring to FIG. 4, a UE 404 may obtain initial access to a network via a base station 402 (e.g., the base station 102 or the mmW base station 180). For initial system access, a default numerology configuration may be used by the base station 402. The default numerology configuration may be pre-configured at the network and/or known by the base station 402 and the UE 404. The default numerology configuration may indicate a default tone spacing for each of the symbols in a subframe. Based on the default numerology configuration, the base station 402 may utilize a default tone spacing for a symbol within a subframe (e.g., symbol 0) for transmitting the PBCH. The PBCH may include the MIB, which provides system information for purposes of initiating a random access channel (RACH) procedure for initial system access. Because the default numerology configuration is used, the UE 404 may be able to receive and decode the PBCH to obtain the information for the RACH procedure. Subsequently, the UE 404 may initiate the RACH procedure by transmitting a first RACH message to the base station 402, and the base station 402 may respond by transmitting a second RACH message to the UE 404. In an aspect, the second RACH message may include a PDCCH and a PDSCH that contains an uplink resource allocation for transmitting additional messages to the base station 402 for purposes of gaining network access. Like the PBCH, the PDCCH may also be transmitted using the default numerology configuration, or another numerology configuration that is indicated by the information sent by PBCH, which enables the UE 404 to properly receive and decode the PDCCH.

Once the UE 404 obtains access to the network, the base station 402 may change the numerology configuration in subsequent subframes. In one example, referring to FIG. 4, the base station 402 may decide to change the numerology in subframe 8 of the same frame or in a subsequent (or later) frame. In this example, referring to FIG. 4, subframe 8 has 15 symbols, although a different number of symbols may also be used. The 15 symbols have symbol indices 0 to 14. Symbol 0 may include a control channel (e.g., the PDCCH) and may have 120 kHz tone spacing. Symbol 1 may also have 120 kHz tone spacing. Symbols 2-14 may include a data channel (e.g., the PDSCH) and may have a 60 kHz tone spacing for data. Symbols with a greater tone spacing have a shorter symbol duration. Accordingly, symbols 0 and 1 in subframe 8, which have double the tone spacing as compared to symbols 2-14 may have half the symbol duration of symbols 2-14. Other numerology configurations (e.g., tone spacings) may also be used.

In other configurations, the numerology configuration may be UE-specific, common to all UEs associated with the base station 402, or common to a subset of UEs associated with the base station 402. In one example, the base station 402 may have a list of available numerology configurations and may select from the list of numerology configurations based on a UE identifier. In another example, the base station 402 may measure channel conditions (e.g., determine which frequencies are busier) and select a numerology configuration based on the measured channel conditions. In yet another example, the base station 402 may receive channel feedback from one or more UEs, and may select the numerology configuration based on channel feedback that may be specific to one UE or common to a subset of UEs.

After determining the numerology configuration, the base station 402 may need a method of signaling the numerology configuration to the UE 404. Without such signaling, if the base station 402 switches numerology configurations, the UE 404 may have to blindly decode the information (e.g., the control channel) because the base station 402 and the UE 404 may have different assumptions about the numerology configurations being used in various subframes. To signal the numerology configuration, the base station 402 may transmit an indication of the numerology configuration in a subframe, such as a fallback subframe. The base station 402 may determine one or more fallback subframes 406 (e.g., subframes 5 and 6) and determine a numerology configuration to use for the one or more fallback subframes 406. In an aspect, the one or more fallback subframes 406 may be UE-specific (each UE is allocated a specific set of fallback subframes), common to all UEs, or specific to a subset of UEs. For example, the base station 402 may determine when to send the one or more fallback subframes 406 based on a UE identifier, a UE group identifier, or based on pre-configured system information. The one or more fallback subframes 406 may have a numerology configuration that is known the UE 404 (or another UE for which the fallback subframe is intended). For example, the base station 402 may determine the numerology configuration to use for communicating in the one or more fallback subframes 406 based on a UE identifier, a UE group identifier, or pre-configured system information (e.g., all fallback subframes are required to use a certain numerology configuration). The one or more fallback subframes 406 (e.g., subframes 5 and 6) may indicate a numerology configuration to be used for communication between the base station 402 and the UE 404 in future or subsequent communications (e.g., within subframe 8). For example, a fallback subframe may identify a particular subframe within a frame on which the numerology configuration is to change and the numerology configuration to be used in the particular subframe. Because the UE 404 knows the numerology configuration of the fallback subframe, the UE 404 may be able to accurately decode the information in the one or more fallback subframes 406 to determine the numerology configuration for future communications. In an aspect, the one or more fallback subframes 406 may indicate a numerology configuration to be used for any type of future subframe, including future fallback subframes.

As an example, referring to FIG. 4, the numerology configuration for subframe 8 is associated with a first tone spacing for symbols 0 and 1 and associated with a control channel and a gap symbol, which may contain control information or reference signals. The numerology configuration may also be associated with a second tone spacing for symbols 2 to 14 on which a data channel is to be transmitted. The numerology configuration may indicate the first tone spacing for symbols 0 and 1 and/or the second tone spacing for symbols 2 to 14.

In another configuration, the base station 402 may determine the numerology configuration to be used for communicating with the UE 404 based on a handshaking procedure. The base station 402 and the UE 404 may engage in a handshaking procedure before the base station 402 switches to a different numerology configuration. In this configuration, the base station 402 may transmit an activation command to the UE 404 that indicates when the numerology configuration will change or take effect. For example, the activation command may indicate the numerology configuration (e.g., tone spacings on different symbols for control and data) and one or more subframes in which the numerology configuration will take effect. In an aspect, the activation command may be included within the one or more fallback subframes 406. Upon receiving the activation command, the UE 404 may transmit an acknowledgment 408 of the activation command to the base station 402 if the UE 404 is capable of switching numerology configurations at the indicated time. After the base station 402 receives the acknowledgment 408, the base station 402 may begin transmitting a set of subframes 410 to the UE 404 based on the determined numerology configuration. In an aspect, instead of providing the acknowledgment 408, the UE 404 may negotiate the numerology configuration by providing a different numerology configuration to the base station 402. If the base station 402 agrees, then the base station 402 may retransmit the numerology configuration to the UE 404, and the UE 404 may acknowledge the retransmission. Upon receiving the acknowledgment, the base station 402 may be permitted to switch to the different numerology configuration.

In another configuration, the base station 402 may want to indicate to the UE 404 when to expect the one or more fallback subframes 406. For example, the base station 402 may signal a periodicity with which the one or more fallback subframes 406 will be transmitted (e.g., every other frame, subframe 0 in every frame, etc.). In one aspect, the base station 402 may signal when to expect the one or more fallback subframes 406 in a MIB, SIB, and/or in RRC signaling.

In another configuration, the base station 402 may not need to signal when the UE 404 is to expect the one or more fallback subframes 406 because that information may be pre-configured. For example, all the UEs may know to expect the base station 402 to transmit fallback subframes at certain points in time or in certain subframes within a frame. In another configuration, the determined numerology configuration may be signaled in a MIB, a SIB, or in RRC signaling. In another aspect, the numerology configuration may be pre-configured. For example, certain subframe indices may be associated with a first numerology configuration and other subframe indices may be associated with a second numerology configuration. The first numerology configuration may be the same or different from the second numerology configuration. In this example, the first and second numerology configurations and the subframe indices to which the configurations correspond may be known to the UEs and the base station 402. In another aspect, the numerology configuration may be fixed or semi-persistent, or may change dynamically.

Figure 5:
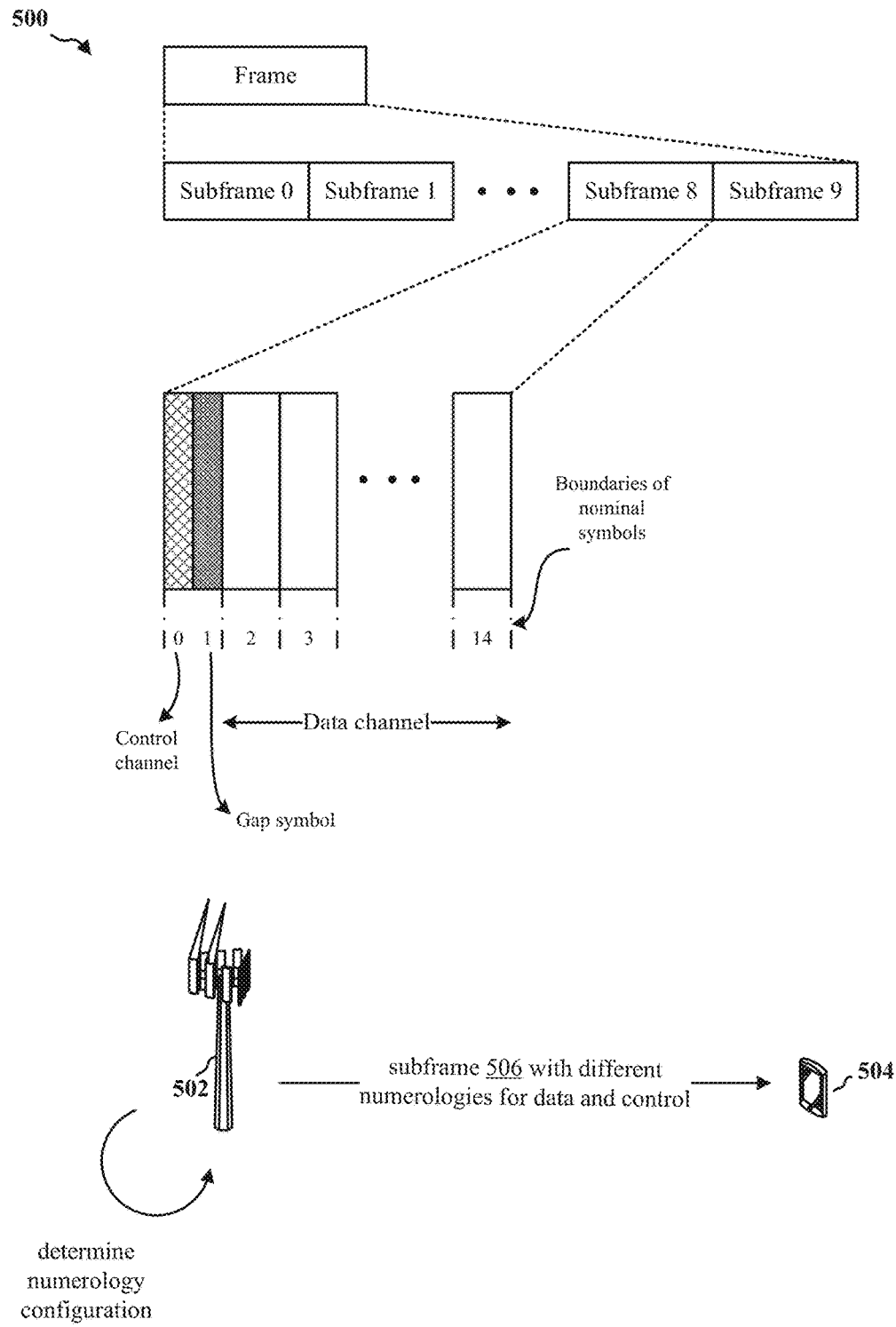
FIG. 5 is a diagram of a method for supporting different numerology configurations for data and control channels.

FIG. 5 is a diagram 500 of a method for supporting different numerology configurations for data and control channels. Referring to FIG. 5, a subframe 506, such as subframe 8, within a frame may have a numerology configuration such that different symbols in the subframe have different numerologies. In this example, subframe 8 has 15 symbols, although a different number of symbols may also be used. The 15 symbols have symbol indices 0 to 14. Symbol 0 may include a control channel (e.g., the PDCCH) and may have 120 kHz tone spacing. Symbol 1 (a gap symbol) may also have 120 kHz tone spacing. Symbols 2-14 may include a data channel (e.g., the PDSCH) and may have a 60 kHz tone spacing for data. Symbols with a greater tone spacing have a shorter symbol duration. Accordingly, symbols 0 and 1 in subframe 8, which have double the tone spacing as compared to symbols 2-14 may have half the symbol duration of symbols 2-14. Other numerology configurations (e.g., tone spacings) may also be used.

Referring to FIG. 5, a base station 502 may determine a nominal numerology on which to base a numerology configuration. In an aspect, the nominal numerology may be preconfigured. For example, the nominal numerology may be associated with a 60 kHz tone spacing within a symbol. In one configuration, the base station 502 may determine to use a numerology configuration in which the control channel and the data channel have the same numerology such as a 60 kHz tone spacing (1× the nominal numerology) or a 120 kHz tone spacing (2× the nominal numerology).

In another configuration, the base station 502 may determine to use a numerology configuration in which the control channel in symbol 0 (e.g., a first set of symbols) and the data channel in symbols 2 to 14 (e.g., a second set of symbols) may have different numerologies. In one aspect, the tone spacing for the control channel in symbol 0 may have twice the tone spacings as the data channel in symbols 2-14 as shown in subframe 8. Assuming the nominal tone spacing is 60 kHz, then the control channel may have a tone spacing that is 2× the nominal tone spacing, and the data channel may have a tone spacing that is 1× the nominal tone spacing. Other multiples of the nominal tone spacing may also be used.

In another configuration, the base station 502 may also determine to utilize symbol 1 for transmitting the data channel. When the control channel and the data channel have the same numerology, the base station 502 may determine to time-division multiplex the control channel and the data channel onto adjacent symbols, such as symbol 0 for the control channel and symbol 1 for the data channel (along with the remaining symbols within the subframe for the data channel). However, when the control channel and the data channel have different numerologies, as shown in subframe 8, then the base station 502 may determine not to time-division multiplex the control channel in symbol 0 with the data channel in symbol 1.

In another configuration, the base station 502 may determine to utilize symbol 1 (the gap symbol) for transmitting control information. For example, the base station 502 may utilize symbol 1 to transmit reference signals or L1 control signals. In this configuration, symbol 1 may have a same or different numerology (e.g., tone spacing) as symbol 0.

Referring to FIG. 5, the base station 502 may transmit a signal in subframe 8 to a UE 504. The UE 504 may receive the signal in the subframe in which a first tone spacing (e.g., 120 kHz) is used for a control channel in symbol 0 and a second tone spacing (e.g., 60 kHz) is used for a data channel in symbols 2 to 14. The subframe may also include a gap symbol that also uses the first tone spacing. The UE 504 may decode the subframe based on the numerology configuration of the subframe. For example, the UE 504 may determine the first and second tone spacings and extract the control information and data based on the first and second tone spacings. The UE 504 may determine the first and second tone spacings based on a received fallback subframe as described in FIG. 4. The fallback subframe may also indicate the tone spacing in the gap symbol, and the UE 504 may extract either control information or data from the gap symbol.

Although FIG. 5 illustrates using the gap symbol when multiplexing the downlink control channel and the downlink data channel, a gap symbol may also be used in the uplink context. For example, when the UE 504 multiplexes the uplink control channel, which may have a first set of symbols, and the uplink data channel, which may have a second set of symbols, within a subframe, the UE 504 may separate the two channels using one or more gap symbols.

Thus far, FIG. 5 has illustrated that the gap symbol (e.g., symbol 1) may be used when control and data are multiplexed with different numerologies within a subframe (or a slot). The gap symbol serves to preserve the alignment of a set of symbols (e.g., symbols 2-14) with the nominal symbol boundaries as depicted in FIG. 5. Without the gap symbol, symbols 2-14 may not align with the nominal symbol boundaries. Although FIG. 5 illustrates a single gap symbol, a different number of gap symbols may also be used. The use of gap symbols within a subframe may also be extended to other scenarios.

Figure 6A:
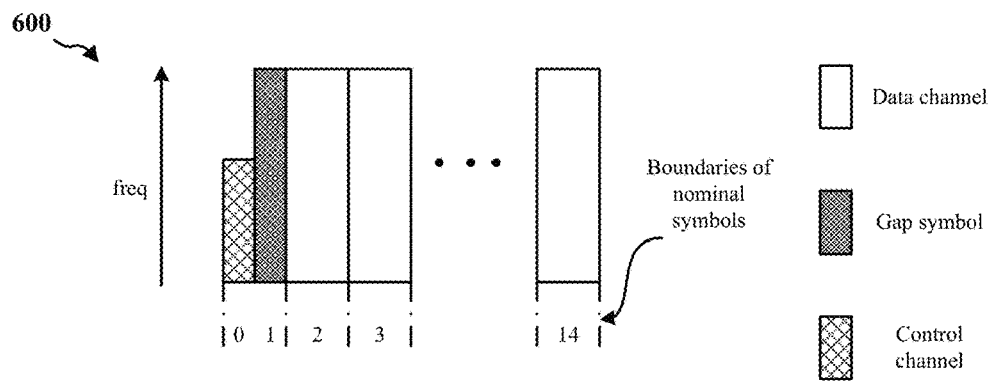
FIGS. 6A-D illustrate additional uses of gap symbols (or transmission gaps) within a subframe.

FIGS. 6A-D illustrate additional uses of gap symbols (or transmission gaps) within a subframe. Aside from using gap symbols when multiplexing a control channel (uplink or downlink) with a data channel (uplink or downlink) having different numerologies, the gap symbols may also be used if the control channel has a different transmission bandwidth compared to the data channel. FIG. 6A illustrates a subframe 600 with a control channel, a data channel, and a gap symbol. The control channel may have a narrower transmission bandwidth (e.g., 10 MHz bandwidth) than a data channel (e.g., 20 MHz bandwidth) or vice versa. The difference in bandwidth may occur when a UE, for example, operates in a power saving mode. In this mode, the UE may need time, after receiving from a base station one or more control symbol(s) with a narrower bandwidth, to adjust its receiver (or receive chain) to collect samples of the data over a wider bandwidth. The gap symbol 1 in between the control channel (symbol 0) and the data channels (symbols 2-14) provides the UE with additional time to adjust its receiver. Although FIG. 6A describes the usage of the gap symbol in the downlink context, the same methods, principles, and techniques may be applied in the uplink context. For example, the base station may receive the control channel with a narrower bandwidth and receive the data channel with a wider bandwidth. The first set of symbols corresponding to the control channel may be separated from the second set of symbols corresponding to the data channel by one or more gap symbols. Although FIG. 6A illustrates the control channel and the data channel having different numerologies, the gap symbol may be utilized when the data and control channels have the same numerology but different bandwidths.

Figure 6B:
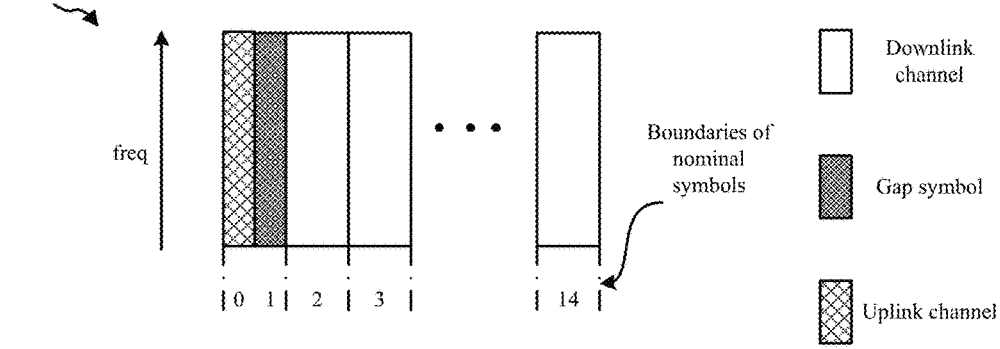

FIG. 6B illustrates a subframe 620 with an uplink channel, a downlink channel, and a gap symbol. Although one gap symbol is illustrated, additional gap symbols may be used to separate the uplink channel and the downlink channel. In this example, when a UE switches from transmission mode (e.g., transmitting on the uplink channel) to reception mode (e.g., receiving on the downlink channel) and vice versa, the gap symbol may be utilized to provide the UE time to switch between modes during a subframe. In one configuration, as shown in FIG. 6B, the UE may transmit uplink control information, and then after a gap symbol, switch to receiving downlink data. In another configuration, the UE may receive downlink control information and switch to transmit uplink data within a subframe. In another configuration, the UE may switch from receiving downlink data to transmitting uplink control information. Any time there is a switch in allocated resources (e.g., uplink to downlink or vice versa), one or more gap symbols may be used to separate the types of resources. The gap symbols may be even more beneficial when the switch involves channels associated with symbols of different numerologies or bandwidths. The aforementioned principles may also apply to base stations in addition to UEs.

Figure 6C:
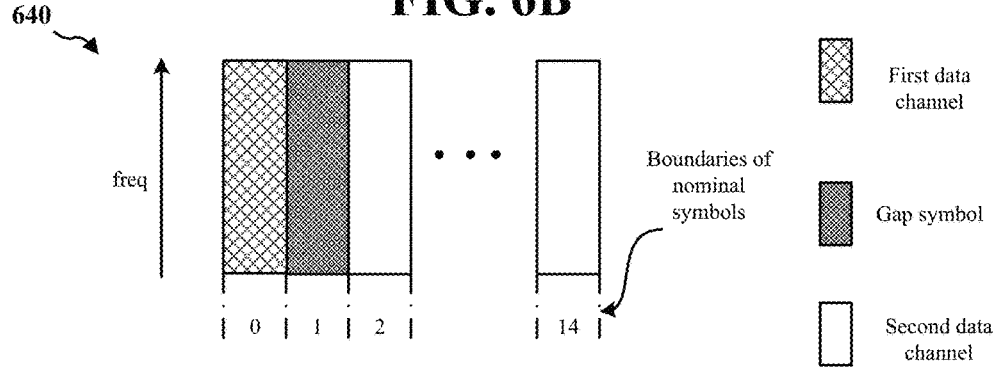

FIG. 6C illustrates a subframe 640 with a first data channel, a gap symbol, and a second data channel. Although one gap symbol is illustrated, additional gap symbols may be used to separate the first data channel and the second data channel. In one configuration, the first data channel may be used to provide a first service and the second data channel may be used to provide a second service. The second service may be different from the first service because the second service may have different quality of service requirements, for example. In another configuration, the first and second data channels may have different numerologies. In another configuration, the first and second data channels may have different bandwidths. In another configuration, the first channel may be an ultra-reliable and low-latency (URLLC) channel and the second channel may be an enhanced mobile broadband (eMBB) channel. Because different services may have different numerologies due to the different use cases and requirements, a gap symbol may be used to separate a first set of symbols (e.g., one or more symbols) associated with the first channel from the second set of symbols (e.g., one or more symbols) associated with the second channel. In an aspect, although the first data channel has one symbol, the first data channel may have a different number of symbols. In another aspect, although the subframe 640 does not illustrate control symbols, the subframe 640 may have one or more control symbols.

Figure 6D:
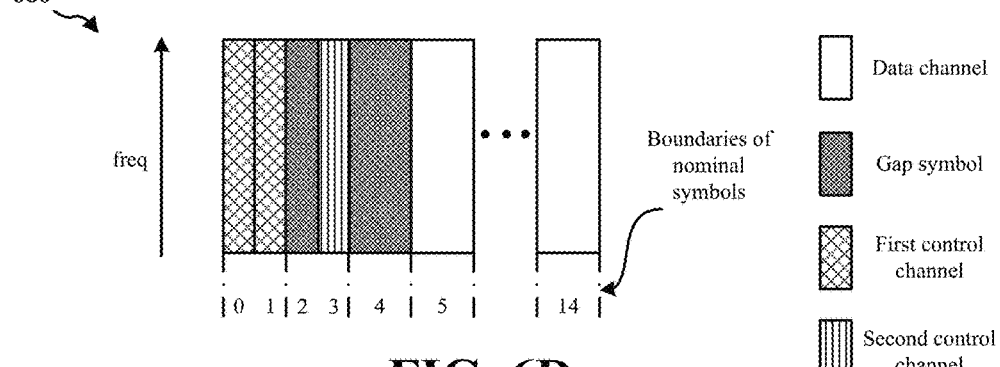

FIG. 6D illustrates a subframe 660 with a first control channel, a second control channel, multiple gap symbols, and a data channel. In some instances, multiple control symbols of the same or different numerologies may be implemented in a subframe. For example, a base station may transmit a single or multiple control symbols for beam management (or beam training) in a first control channel within a slot. The base station may transmit reference signals in the control symbols within the first control channel. In an aspect, the control symbols for beam management may be known as CSI-RS symbols, which may be transmitted in symbols 0 and 1 of the subframe 660. The CSI-RS symbols may have a different or the same numerology than other control symbols in a second control channel (at symbol 3). In an aspect, a gap symbol 2 may separate the first and second control channels. Another gap symbol 4 may separate the second control channel from the data channel located at data symbols 5-14. As such, because the CSI-RS symbols may have different numerologies than other control and/or data symbols, one or more gap symbols may be used when multiplexing symbols used for beam management with other symbols.

Figure 7:
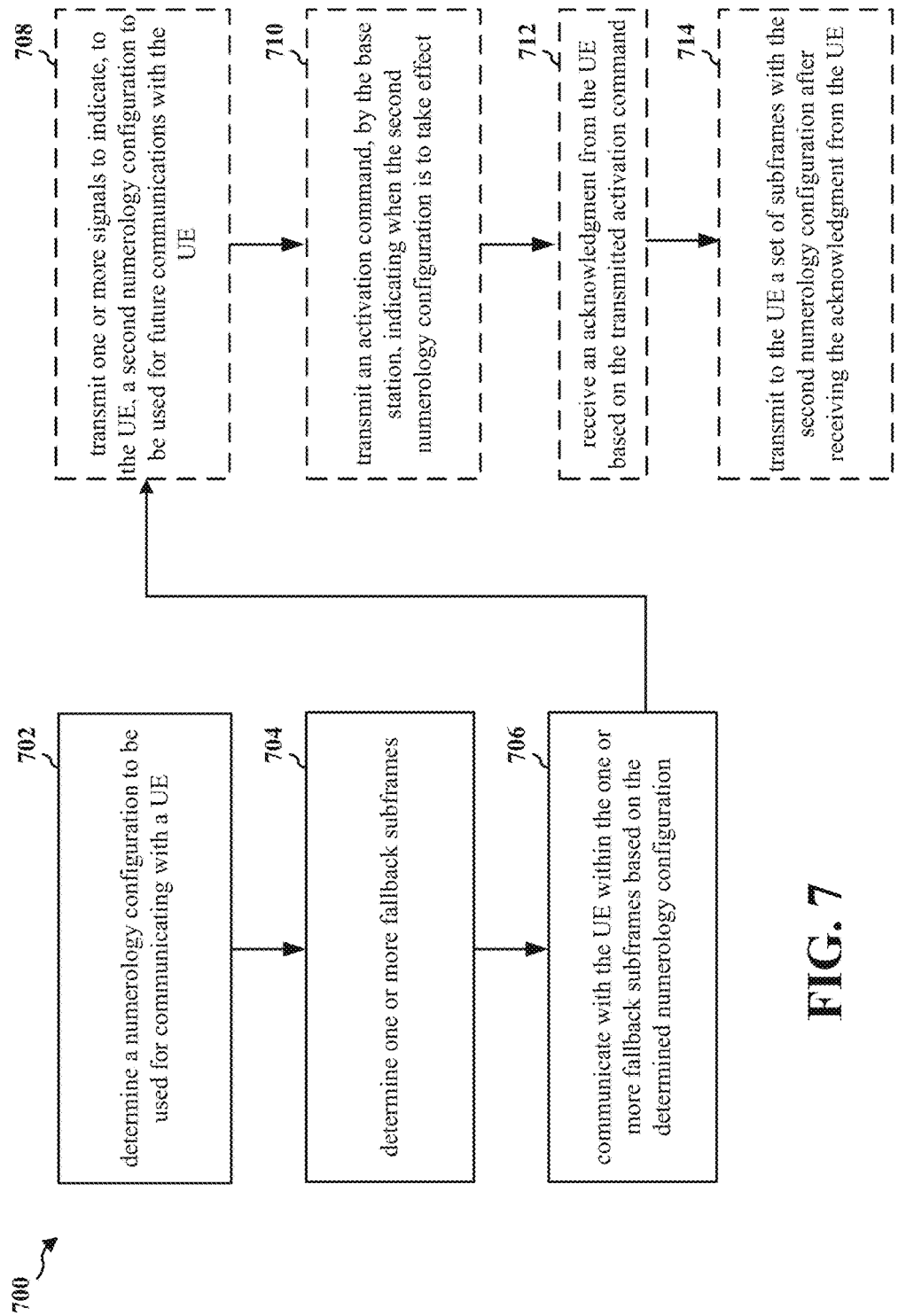
FIG. 7 is a flowchart of a method of wireless communication.

FIG. 7 is a flowchart 700 of a method of wireless communication. The method may be performed by a base station (e.g., the base station 102, the base stations 402, 502, the mmW base station 180). At 702, the base station may determine a numerology configuration to be used for communication with a UE in one or more fallback subframes. In an aspect, the determined numerology configuration may be fixed, semi-persistent, or change dynamically. For example, referring to FIG. 4, the base station may be the base station 402. The base station 402 may determine a numerology configuration to be used for communicating with the UE 404. In an aspect, the base station 402 may determine the numerology configuration based on a UE identifier, a UE group identifier, or pre-configured system information (e.g., known to the UE 404). That is, the numerology configuration may be UE-specific, common to all UEs, or common to a subset of UEs associated with the base station 402. The numerology configuration may be a default numerology configuration that is known to the UE.

At 704, the base station may determine one or more fallback subframes. In an aspect, the base station may determine the one or more fallback subframes by determining when to transmit the one or more fallback subframes. For example, referring to FIG. 4, the base station 402 may determine one or more fallback subframes 406 by determining when to transmit the one or more fallback subframes 406. In an aspect, the timing of when to transmit the one or more fallback subframes 406 may be UE-specific, common to all UEs associated with the base station 402, or common to a subset of UEs associated with the base station 402. In this aspect, the base station 402 may determine when to transmit based on a UE identifier or a UE group identifier. In another aspect, the timing of when to transmit the one or more fallback subframes 406 may be pre-configured (e.g., during subframe 1 and/or 2 of every frame). In an aspect, the base station 402 may indicate when the one or more fallback subframes 406 will be transmitted in a MIB, SIB, or RRC signaling.

At 706, the base station may communicate with the UE within the one or more fallback subframes based on the determined numerology configuration. The determined numerology configuration may be known to the UE. For example, referring to FIG. 4, the base station 402 may communicate with the UE 404 within the one or more fallback subframes 406. In one configuration, the base station 402 may communicate with the UE 404 by transmitting the one or more fallback subframes 406 to the UE 404.

At 708, the base station may transmit one or more signals to indicate, to the UE, a second numerology configuration to be used for future communications with the UE. The second numerology configuration may indicate a numerology configuration for subsequent subframes and/or subsequent fallback frames. For example, referring to FIG. 4, the base station 402 may transmit one or more signals to indicate, to the UE 404, a second numerology configuration to be used for future communications with the UE 404. In an aspect, the, the one or more signals may be transmitted within a subset of the one or more fallback subframes 406.

In another configuration, the base station may engage in a handshaking procedure before switching numerology configurations. In this configuration, at 710, the base station may transmit an activation command indicating when the second numerology configuration is to take effect. The activation command may be transmitted in a fallback subframe. For example, referring to FIG. 4, the base station 402 may transmit the activation command that indicates when the second numerology configuration is to take effect. The activation command may be transmitted in the one or more fallback subframes 406 or elsewhere.

In this configuration, at 712, the base station may receive an acknowledgment from the UE based on the transmitted activation command. For example, referring to FIG. 4, the base station 402 may receive the acknowledgment 408 from the UE 404 based on the transmitted activation command, and the acknowledgment 408 may indicate that the UE 404 acknowledges the change to the second numerology configuration in subsequent subframes received from the base station 402.

At 714, the base station may transmit to the UE a set of subframes with the second numerology configuration after receiving the acknowledgment from the UE. For example, referring to FIG. 4, the base station 402 may transmit to the UE 404 the set of subframes 410 after receiving the acknowledgment 408 from the UE 404. In another configuration, the base station 402 may not engage in a handshake, and therefore, may transmit the set of subframes 410 without receiving the acknowledgment 408.

Figure 8:
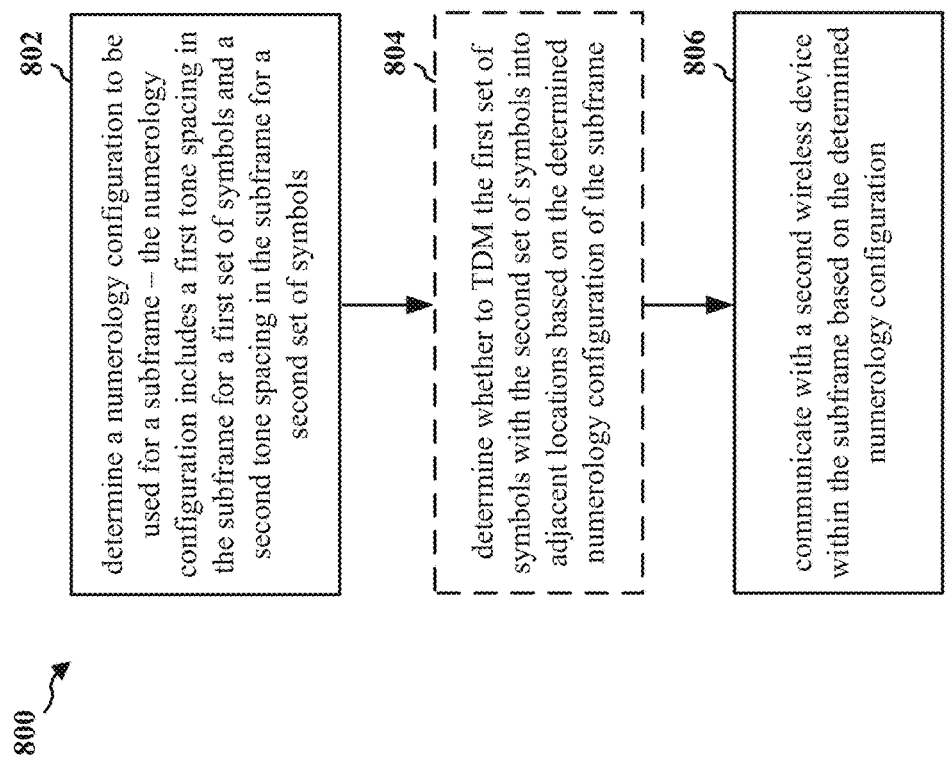
FIG. 8 is a flowchart of a method of wireless communication.

FIG. 8 is a flowchart 800 of a method of wireless communication. The method may be performed by a first wireless device (e.g., the base station 102, the base stations 402, 502, the mmW base station 180, the UE 104, the UE 182, the UE 404, or the UE 504).

At 802, the first wireless device may determine a numerology configuration to be used for a subframe. The numerology configuration may be based on a nominal numerology (e.g., 60 kHz tone spacing). The numerology configuration may include a first tone spacing in the subframe for a first set of symbols (e.g., a control channel with one or more symbols) and a second tone spacing in the subframe for a second set of symbols (e.g., a data channel with one or more symbols). In an aspect, the first tone spacing is the same as the second tone spacing. In another aspect, the first tone spacing is different from the second tone spacing. In another aspect, the first tone spacing is an integer multiple of a tone spacing of the nominal numerology and the second tone spacing is a second integer multiple of the nominal numerology. In one example, referring to FIG. 5, the first wireless device may be the base station 502. The base station 502 may determine a nominal numerology for a subframe. Based on the nominal numerology, the base station 502 may determine a numerology configuration to be used for a subframe. The base station 502 may determine the numerology configuration by determining a first tone spacing (e.g., 120 kHz tone spacing) for a control channel, and the first tone spacing is an integer multiple (e.g., multiple of 2) of the nominal numerology (e.g., 60 kHz tone spacing). The base station 502 may further determine the numerology configuration by determining a second tone spacing (e.g., 60 kHz) for a data channel, and the second tone spacing is an integer multiple (e.g., multiple of 1) of the nominal numerology.

At 804, the first wireless device may determine whether to TDM the first set of symbols with the second set of symbols into adjacent locations based on the determined numerology configuration of the subframe. For example, referring to FIG. 5, the base station 502 may determine whether to TDM the control channel with the data channel onto adjacent symbols based on the determined numerology configuration of the subframe. On the one hand, the base station 502 may determine not to TDM the control channel with the data channel if the adjacent symbols have different tone spacings (e.g., 60 kHz and 120 kHz) and the transmission of the two adjacent symbol will overlap with symbol boundaries corresponding to the nominal numerology. On the other hand, the base station 502 may determine to TDM the control channel with the data channel if the adjacent symbols have the same tone spacings. In another example, the base station 502 may determine to TDM the control channel with the data channel even if the adjacent symbols have different tone spacings if the transmission of the adjacent symbols will not overlap with symbol boundaries corresponding to the nominal numerology.

At 806, the first wireless device may communicate with a second wireless device within the subframe based on the determined numerology configuration. In one example, referring to FIG. 5, the base station 502 may communicate by transmitting the subframe 506 to the UE 504. In another example, referring to FIG. 5, if the first wireless device is the UE 504, then the UE 504 may communicate with the base station 502 (the second wireless device) by receiving the subframe 506 and by decoding the subframe (as further discussed in FIG. 10 below). The UE 504 may determine the numerology configuration based on the methods and techniques discussed with respect to FIG. 4, for example.

Figure 9:
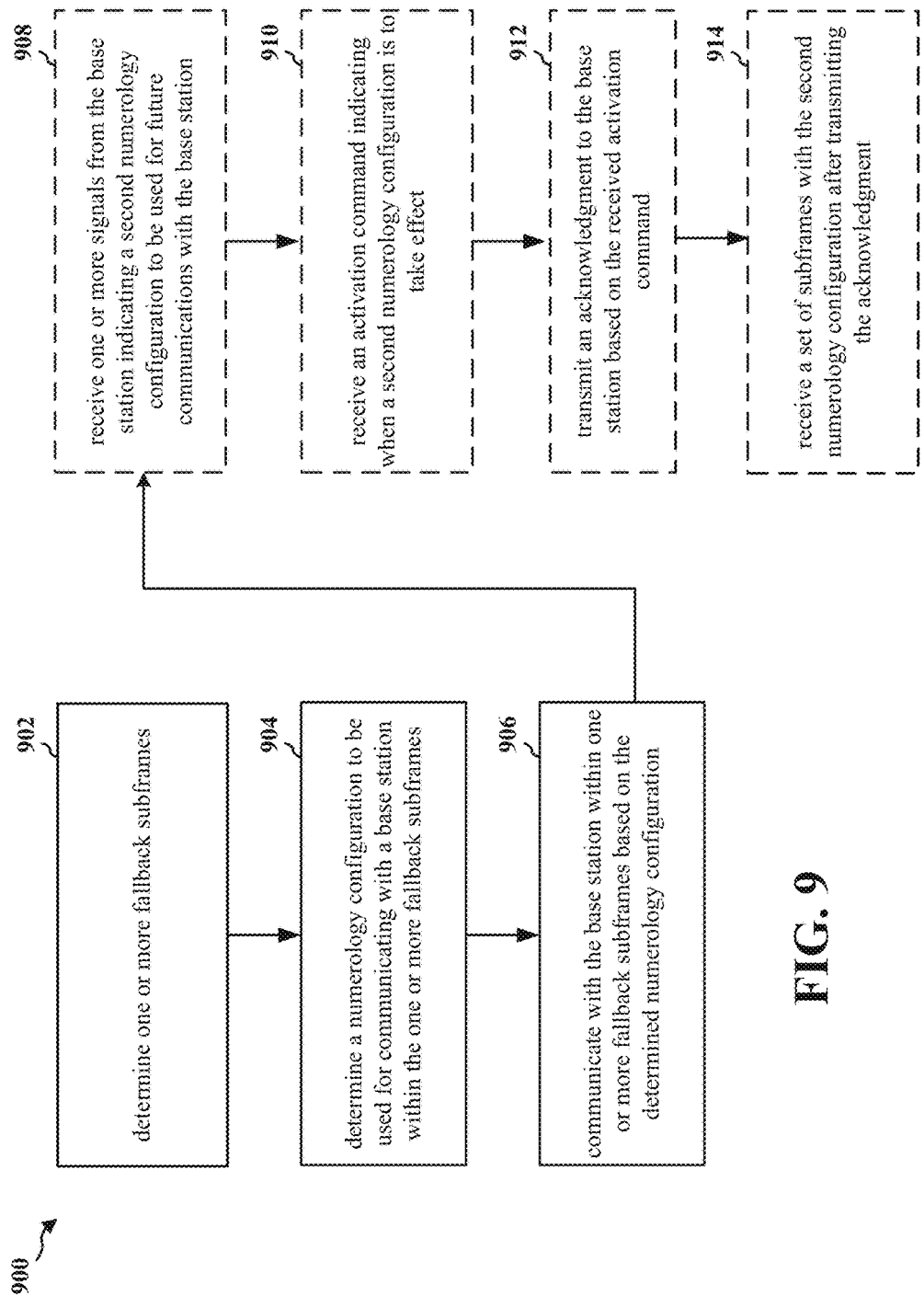
FIG. 9 is a flowchart of a method of wireless communication.

FIG. 9 is a flowchart 900 of a method of wireless communication. The method may be performed by a UE (e.g., the UE 104 or the UE 182). At 902, the UE may determine one or more fallback subframes. In an aspect, the UE may determine when a base station will transmit the one or more fallback subframes. For example, referring to FIG. 4, the UE may be the UE 404. The UE 404 may determine one or more fallback subframes by determining when the base station 402 will transmit one or more fallback subframes 406. In one aspect, the UE 404 may determine when the base station 402 will transmit the one or more fallback subframes 406 based on a UE identifier or a UE group identifier. That is, the UE 404 may be preconfigured to know when the base station 402 will transmit one or more fallback subframes 406 according to an identifier. In another aspect, the UE 404 may receive signaling from the base station 402, via the MIB, SIB, or RRC signaling, that indicates when the base station 402 will transmit the one or more fallback subframes 406. The MIB, SIB, and/or RRC signaling may further indicate the numerology configuration to be used in the one or more fallback subframes 406. In another aspect, the numerology configuration to be used for the one or more fallback subframes 406 may be preconfigured within the UE 404.

At 904, the UE may determine a numerology configuration to be used for communication with the base station within the one or more fallback subframes. In an aspect, the UE may know the determined numerology configuration to be used in the one or more fallback subframes based on a received MIB or SIB. In another aspect, the numerology configuration may be preconfigured within the UE. For example, referring to FIG. 4, the UE 404 may determine the numerology configuration to be used for communicating with the base station 402 within the one or more fallback subframes 406. The UE 404 may determine the numerology by receiving a MIB or a SIB and by determining the numerology configuration indicated in the MIB or the SIB. In another configuration, the numerology configuration may be preconfigured into the UE 404.

At 906, the UE may communicate with the base station within one or more fallback subframes based on the determined numerology configuration. The UE may receive the one or more fallback subframes in downlink transmissions. The UE may also use the one or more fallback frames to transmit information to the base station in uplink transmissions. For example, referring to FIG. 4, the UE 404 may communicate with the base station 402 within the one or more fallback subframes 406. The UE 404 may communicate within the one or more fallback subframes by receiving one or more fallback subframes from the base station 402.

At 910, the UE may receive one or more signals from the base station indicating a second numerology configuration to be used for future communications with the base station. In an aspect, the one or more signals are transmitted in the fallback subframes. For example, referring to FIG. 4, the UE 404 may receive one or more signals from the base station 402 indicating a second numerology configuration to be used for subsequent communications with the base station 402. The one or more signals may be received in the one or more fallback subframes 406.

In another configuration, the UE and the base station may perform a handshaking procedure before transitioning between different numerology configurations. In this configuration, at 910, the UE may receive an activation command indicating when a second numerology configuration is to take effect. The activation command may be transmitted in a fallback subframe. For example, referring to FIG. 4, the UE 404 may receive the activation command that indicates when the second numerology configuration is to take effect. The activation command may be transmitted in the one or more fallback subframes 406 or elsewhere.

At 912, the UE may transmit an acknowledgment to the base station based on the received activation command. For example, referring to FIG. 4, the UE 404 may transmit the acknowledgment 408 to the base station 402 based on the received activation command, and the acknowledgment 408 may indicate that the UE 404 acknowledges the change to the second numerology configuration in subsequent subframes received from the base station 402.

At 914, the UE may receive a set of subframes with the second numerology configuration after transmitting the acknowledgment. For example, referring to FIG. 4, the UE 404 may receive the set of subframes 410 after transmitting the acknowledgment 408 to the base station 402. In another configuration, the UE 404 may not engage in a handshake, and therefore, may receive the set of subframes 410 without transmitting the acknowledgment 408.

Figure 10:
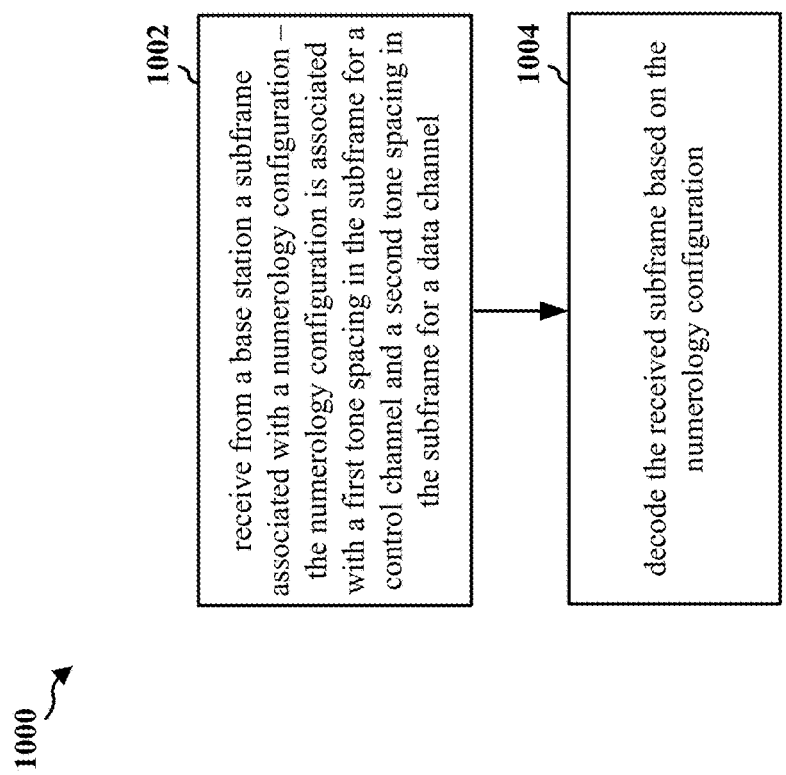
FIG. 10 is a flowchart of a method of wireless communication.

FIG. 10 is a flowchart 1000 of a method of wireless communication. The method may be performed by a UE (e.g., the UE 504). At 1002, the UE may receive from a base station a subframe associated with a numerology configuration. The numerology configuration may be associated with a first tone spacing in the subframe for a control channel and a second tone spacing in the subframe for a data channel. For example, referring to FIG. 5, the UE may be the UE 504. The UE 504 may receive from the base station 502 the subframe 506 having a numerology configuration different numerologies for data and control channels.

At 1004, the UE may decode the received subframe based on the numerology configuration. For example, referring to FIG. 5, the UE 504 may decode the subframe 506 based on the numerology configuration. The UE 504 may decode the subframe 506 by determining the first and second tone spacings associated with the numerology configuration based on a received fallback subframe and by extracting the control information and/or data from the subframe 506 based on the first and second tone spacings.

Figure 11:
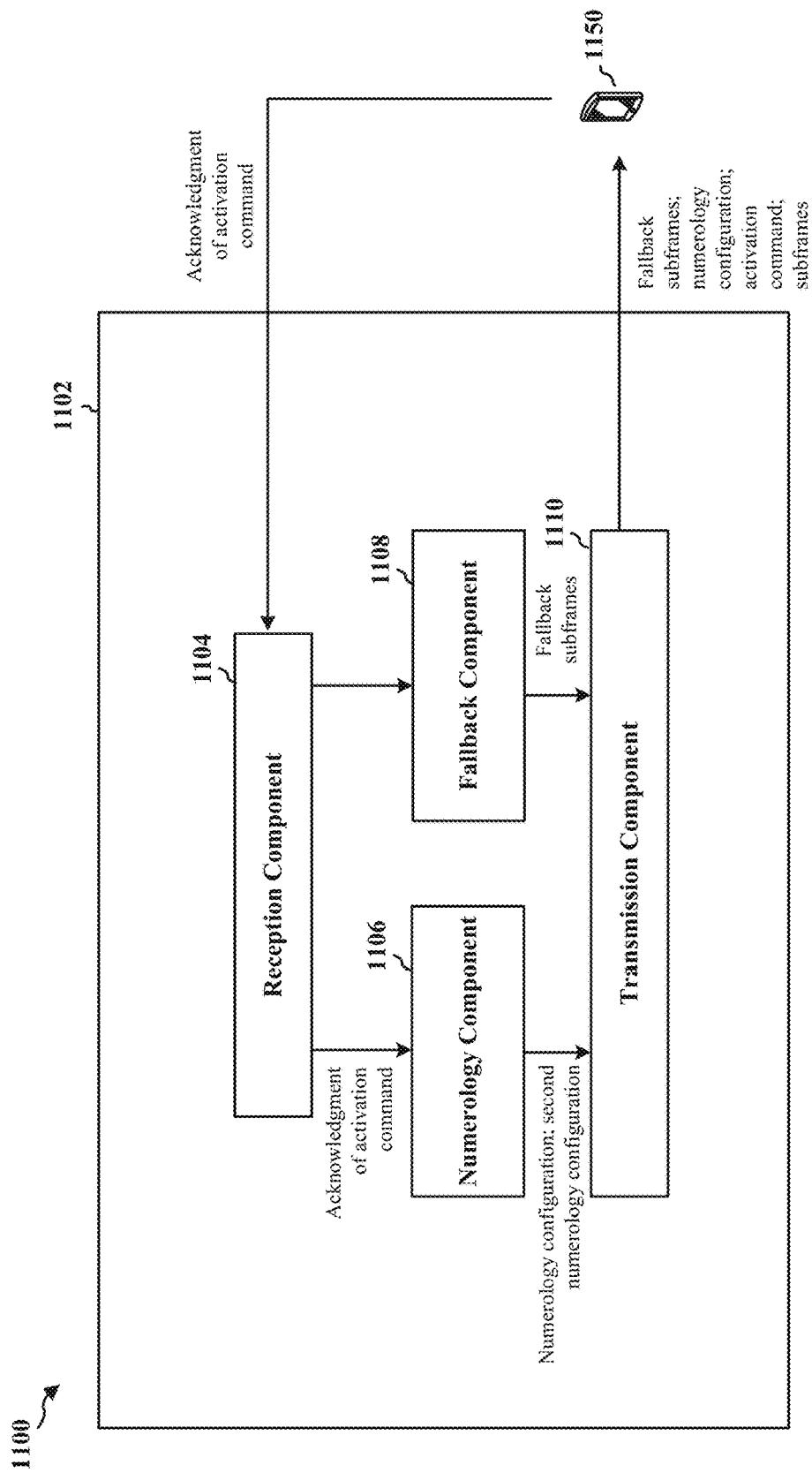
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station (e.g., the base station 402 or the base station 502) or a UE (e.g., the UE 404 or the UE 504). The apparatus includes a reception component 1104, a numerology component 1106, a fallback component 1108, and a transmission component 1110. In one configuration, the numerology component 1106 may be configured to determine a numerology configuration to be used for communicating with a UE 1150. The fallback component 1108 may be configured to determine one or more fallback subframes. The reception component 1104 and/or the transmission component 1110 may be configured to communicate with the UE 1150 within the one or more fallback subframes based on the determined numerology configuration. In one instance, the transmission component 1110 may be further configured to transmit one or more signals to indicate, to the UE 1150, a second numerology configuration to be used for future communications with the UE 1150. In an aspect, the transmission of the one or more signals may take place within a subset of the one or more fallback subframes. In another instance, the transmission component 1110 may be configured to transmit an activation command indicating when the second numerology configuration is to take effect, the reception component 1104 may be configured to receive an acknowledgment from the UE 1150 based on the transmitted activation command, and the transmission component 1110 may be configured to transmit to the UE 1150 a set of subframes with the second numerology configuration after receiving the acknowledgment from the UE 1150. In an aspect, the transmission of the one or more signals may indicate at least one of a third numerology configuration to be used in a future subframe or may indicate a fourth numerology configuration to be used in a future fallback subframe. In another aspect, the transmission of the one or more signals may indicate a tone spacing for a symbol on which a control channel is to be transmitted in a future subframe. In another aspect, the one or more fallback subframes may be UE-specific, common to all UEs associated with the base station, or common to a subset of UEs associated with the base station. In another aspect, information associated with the one or more fallback subframes may be signaled in a MIB, a SIB, or in RRC signaling. In another aspect, the timing of when the one or more fallback subframes is to be transmitted may be pre-configured. In another aspect, the determined numerology configuration may be UE-specific, common to all UEs associated with the base station, or common to a subset of UEs associated with the base station. In another aspect, the determined numerology configuration may be signaled in a MIB, a SIB, or in RRC signaling. In another aspect, the determined numerology configuration may be pre-configured. In another aspect, the determined numerology configuration may be fixed, semi persistent or change dynamically.

In another configuration, the numerology component 1106 may be configured to determine a numerology configuration to be used for a subframe. The numerology configuration may include a first tone spacing in the subframe for a first set of symbols and a second tone spacing in the subframe for a second set of symbols. The reception component 1104 and/or the transmission component 1110 may be configured to communicate with a second wireless device (e.g., a base station or a UE) within the subframe based on the determined numerology configuration. In an aspect, the numerology configuration may be based on a nominal numerology. In another aspect, the subframe may include one or more gap symbols located between the first set of symbols (e.g., one or more symbols) and the second set of symbols (e.g., one or more symbols) in the subframe. In another aspect, the first set of symbols may be associated with a control channel and the second set of symbols may be associated with a data channel. In another aspect, the one or more gap symbols may be located between the control channel and the data channel, and the control channel and the data channel may have different frequency bandwidths. In another aspect, the first set of symbols in the subframe may be allocated for downlink transmission and the second set of symbols in the subframe may be allocated for uplink transmission. In another aspect, the first set of symbols in the subframe may be allocated for downlink control information and the second set of symbols in the subframe may be allocated for downlink data, or the first set of symbols in the subframe may be allocated for uplink control information and the second set of symbols in the subframe may be allocated for uplink data. In another aspect, the first set of symbols may be associated with a first data channel and the second set of symbols may be associated with a second data channel. In another aspect, the first data channel in the subframe may be a channel allocated for URLLC and the second data channel may be a channel allocated for eMBB communications. In another aspect, the first set of symbols may be associated with a first control channel and the second set of symbols may be associated with a second control channel. In another aspect, the one or more gap symbols may be null (e.g., have no data) or include reference signals or L1 control signals. In another aspect, the one or more gap symbols may have a same tone spacing as the first set of symbols or have a different tone spacing from the first set of symbols. In another aspect, the one or more gap symbols may enable the apparatus and/or the second wireless device to switch between a transmit mode and a receive mode or may enable the apparatus and/or the second wireless device to perform beam switching during beam training. In another aspect, the first tone spacing may be the same as the second tone spacing, or the first tone spacing may be different from the second tone spacing. In another aspect, the first tone spacing may be an integer multiple of the second tone spacing. In another aspect, the first tone spacing may be a first integer multiple of a tone spacing of a nominal numerology and the second tone spacing may be a second integer multiple of the tone spacing of the nominal numerology. In another instance, the numerology component 1106 may be configured to determine whether to TDM the first set of symbols with the second set of symbols into adjacent locations within the subframe based on the determined numerology configuration of the subframe. In an aspect, the numerology component 1106 may determine not to TDM the first set of symbols with the second set of symbols into adjacent locations if the first set of symbols and the second set of symbols have different tone spacings and the transmission of the first and the second sets of symbols on the adjacent locations will overlap with symbol boundaries corresponding to a nominal numerology.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
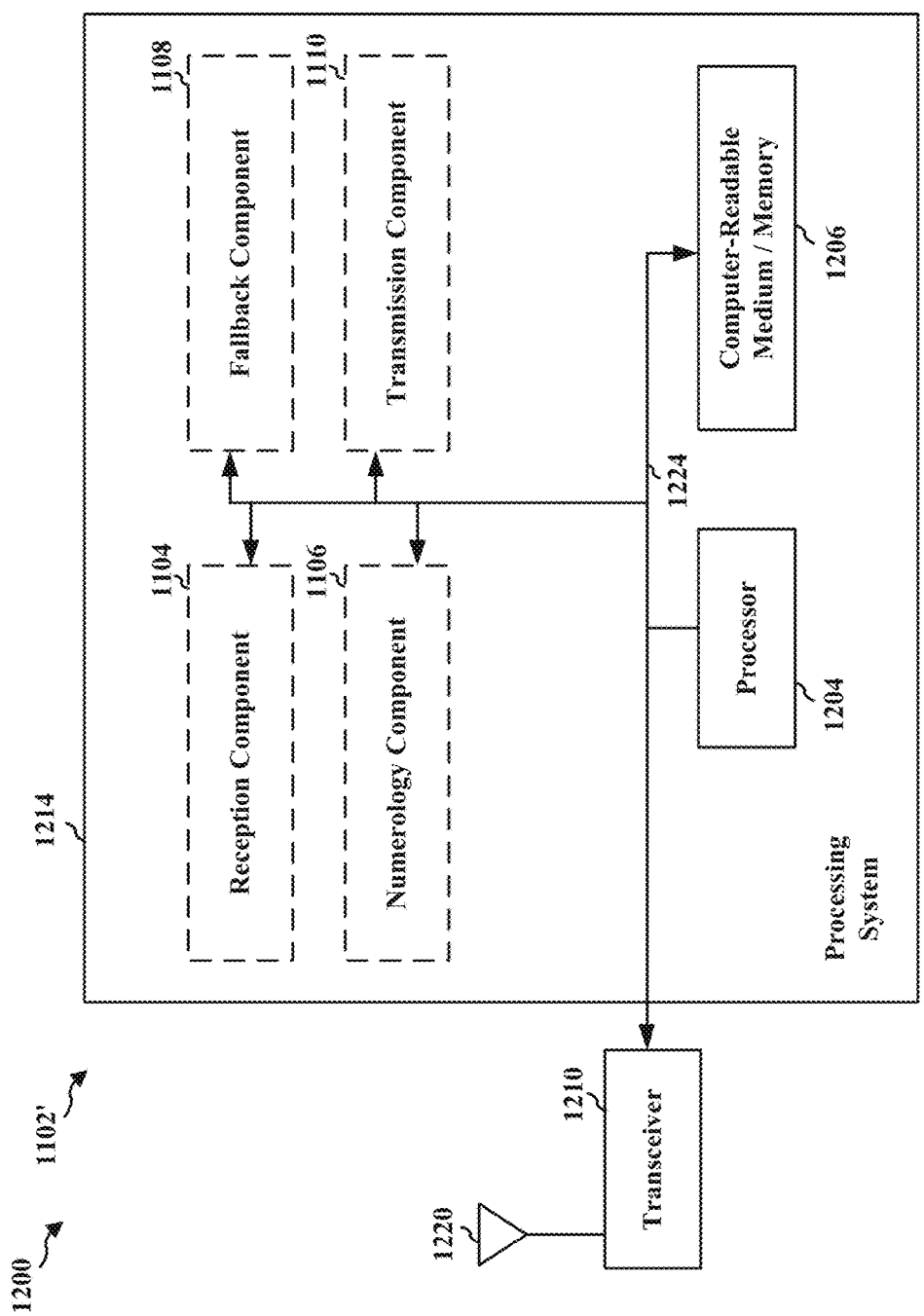
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. In one configuration, the processing system 1214 may be a component of the eNB 310 and may include the memory 376 and/or at least one of the TX processor 316, the RX processor 370, and the controller/processor 375. In another configuration, the processing system 1214 may be a component of the UE 350 and may include the memory 360 and/or at least one of the TX processor 368, the RX processor 356, and the controller/processor 359.

In one configuration, the apparatus 1102/1102' for wireless communication includes means for determining a numerology configuration to be used for communicating with a UE. The apparatus includes means for determining one or more fallback subframes. The apparatus includes means for communicating with the UE within the one or more fallback subframes based on the determined numerology configuration. In one instance, the apparatus may include means for transmitting one or more signals to indicate, to the UE, a second numerology configuration to be used for future communications with the UE. In an aspect, the transmission of the one or more signals may take place within a subset of the one or more fallback subframes. In another instance, the apparatus may include means for transmitting an activation command indicating when the second numerology configuration is to take effect, means for receiving an acknowledgment from the UE based on the transmitted activation command, and means for transmitting to the UE a set of subframes with the second numerology configuration after receiving the acknowledgment from the UE. In an aspect, the transmission of the one or more signals may indicate at least one of a third numerology configuration to be used in a future subframe or may indicate a fourth numerology configuration to be used in a future fallback subframe. In another aspect, the transmission of the one or more signals may indicate a tone spacing for a symbol on which a control channel is to be transmitted in a future subframe. In another aspect, the one or more fallback subframes may be UE-specific, common to all UEs associated with the base station, or common to a subset of UEs associated with the base station. In another aspect, information associated with the one or more fallback subframes may be signaled in a MIB, a SIB, or in RRC signaling. In another aspect, the timing of when the one or more fallback subframes is to be transmitted may be pre-configured. In another aspect, the determined numerology configuration may be UE-specific, common to all UEs associated with the base station, or common to a subset of UEs associated with the base station. In another aspect, the determined numerology configuration may be signaled in a MIB, a SIB, or in RRC signaling. In another aspect, the determined numerology configuration may be pre-configured. In another aspect, the determined numerology configuration may be fixed, semi persistent or change dynamically.

In another configuration, the apparatus 1102/1102' for wireless communication includes means for determining a numerology configuration to be used for a subframe. The numerology configuration may include a first tone spacing in the subframe for a first set of symbols and a second tone spacing in the subframe for a second set of symbols. The apparatus includes means for communicating with a second wireless device (e.g., a base station or a UE) within the subframe based on the determined numerology configuration. In an aspect, the numerology configuration may be based on a nominal numerology. In another aspect, the subframe may include one or more gap symbols located between the first set of symbols (e.g., one or more symbols) and the second set of symbols (e.g., one or more symbols) in the subframe. In another aspect, the first set of symbols may be associated with a control channel and the second set of symbols may be associated with a data channel. In another aspect, the one or more gap symbols may be located between the control channel and the data channel, and the control channel and the data channel may have different frequency bandwidths. In another aspect, the first set of symbols in the subframe may be allocated for downlink transmission and the second set of symbols in the subframe may be allocated for uplink transmission. In another aspect, the first set of symbols in the subframe may be allocated for downlink control information and the second set of symbols in the subframe may be allocated for downlink data, or the first set of symbols in the subframe may be allocated for uplink control information and the second set of symbols in the subframe may be allocated for uplink data. In another aspect, the first set of symbols may be associated with a first data channel and the second set of symbols may be associated with a second data channel. In another aspect, the first data channel in the subframe may be a channel allocated for URLLC and the second data channel may be a channel allocated for eMBB communications. In another aspect, the first set of symbols may be associated with a first control channel and the second set of symbols may be associated with a second control channel. In another aspect, the one or more gap symbols may be null (e.g., have no data) or include reference signals or L1 control signals. In another aspect, the one or more gap symbols may have a same tone spacing as the first set of symbols or have a different tone spacing from the first set of symbols. In another aspect, the one or more gap symbols may enable the apparatus and/or the second wireless device to switch between a transmit mode and a receive mode or may enable the apparatus and/or the second wireless device to perform beam switching during beam training. In another aspect, the first tone spacing may be the same as the second tone spacing, or the first tone spacing may be different from the second tone spacing. In another aspect, the first tone spacing may be an integer multiple of the second tone spacing. In another aspect, the first tone spacing may be a first integer multiple of a tone spacing of a nominal numerology and the second tone spacing may be a second integer multiple of the tone spacing of the nominal numerology. In another instance, apparatus may include means for determining whether to TDM the first set of symbols with the second set of symbols into adjacent locations within the subframe based on the determined numerology configuration of the subframe. In an aspect, the means for determining whether to TDM may determine not to TDM the first set of symbols with the second set of symbols into adjacent locations if the first set of symbols and the second set of symbols have different tone spacings and the transmission of the first and the second sets of symbols on the adjacent locations will overlap with symbol boundaries corresponding to a nominal numerology.

The aforementioned means may be one or more of the aforementioned components of the apparatus 1102 and/or the processing system 1214 of the apparatus 1102' configured to perform the functions recited by the aforementioned means. As described supra, in one configuration, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. In another configuration, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
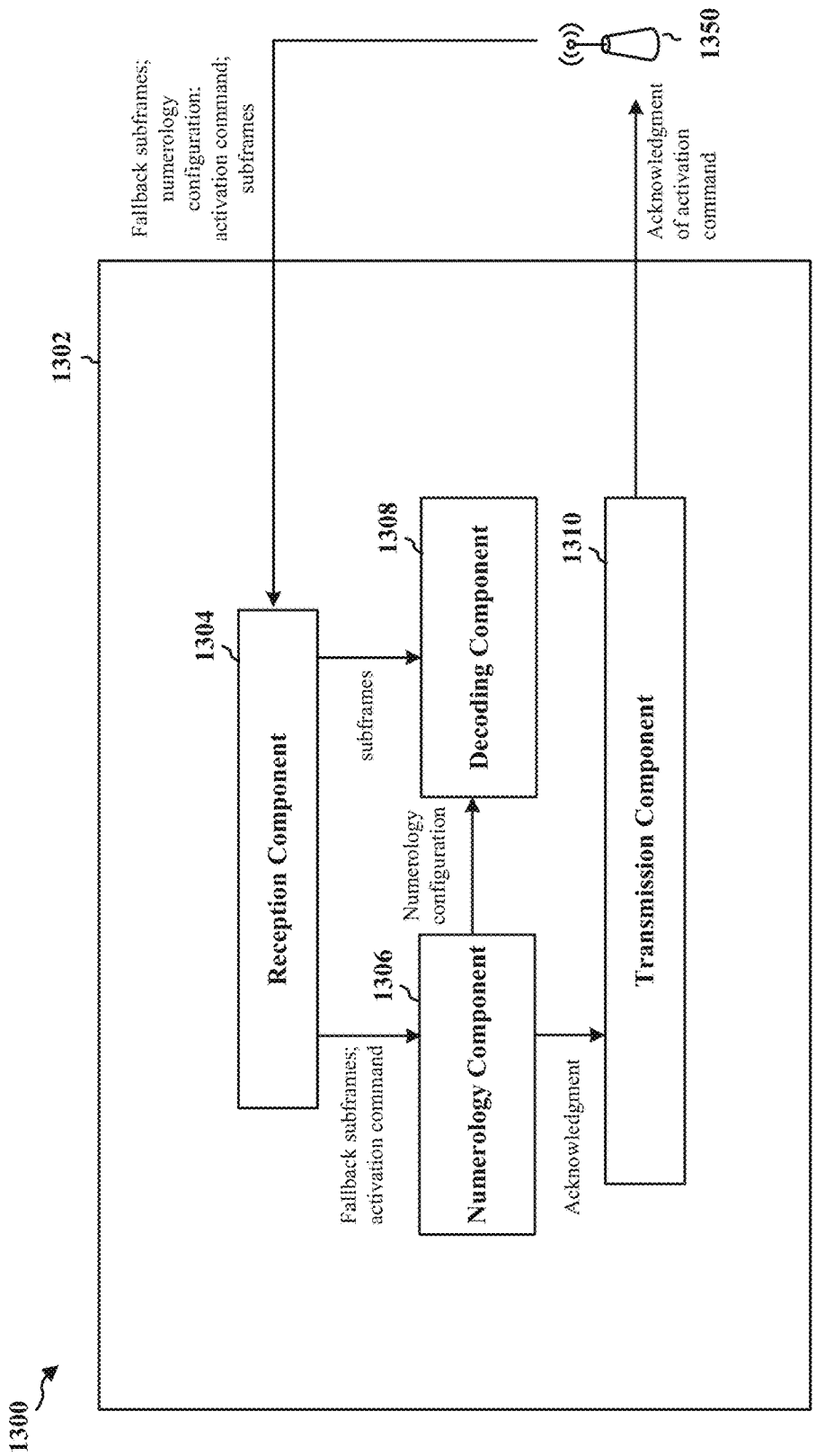
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., the UE 404 or the UE 504). The apparatus includes a reception component 1304, a numerology component 1306, a decoding component 1308, and a transmission component 1310. In one configuration, the numerology component 1306 may be configured to determine one or more fallback subframes and to determine a numerology configuration to be used for communicating with a base station 1350 within the one or more fallback subframes. The reception component 1304 and/or the transmission component 1310 may be configured to communicate with the base station 1350 within one or more fallback subframes based on the determined numerology configuration. In one instance, the reception component 1304 may be configured to receive one or more signals from the base station 1350 indicating a second numerology configuration to be used for future communications with the base station 1350. In an aspect, the reception of the one or more signals may take place within a subset of the one or more fallback subframes. In another aspect, the one or more signals may indicate at least one of a third numerology configuration to be used in a future subframe or indicates a fourth numerology configuration to be used in a future fallback subframe. In another aspect, the one or more signals may indicate a tone spacing for a symbol on which a control channel is to be transmitted in a future subframe. In another instance, the reception component 1304 may be configured to receive an activation command indicating when the second numerology configuration is to take effect. In this instance, the transmission component 1310 may be configured to transmit an acknowledgment to the base station 1350 based on the received activation command. The reception component 1304 may be configured to receive a set of subframes with the second numerology configuration after transmitting the acknowledgment. In an aspect, the one or more fallback subframes may be UE-specific, common to all UEs associated with the base station, or common to a subset of UEs associated with the base station 1350. In another aspect, information associated with the one or more fallback subframes may be signaled in a MIB, a SIB, or in RRC signaling. In another aspect, the one or more fallback subframes may be pre-configured. In another aspect, the numerology configuration may be UE-specific, common to all UEs associated with the base station, or common to a subset of UEs associated with the base station 1350. In another aspect, the numerology configuration may be signaled in a MIB, a SIB, or in RRC signaling. In another aspect, the numerology configuration may be pre-configured. In another aspect, the numerology configuration may be fixed, semi persistent (e.g., remains the same for a predetermined number of subframes) or changes dynamically.

In another configuration, the reception component 1304 may be configured to receive from the base station 1350 a subframe associated with a numerology configuration. The numerology configuration may be associated with a first tone spacing in the subframe for a control channel and a second tone spacing in the subframe for a data channel. The decoding component 1308 may be configured to decode the received subframe based on the numerology configuration. In an aspect, the first tone spacing may be the same as the second tone spacing. In another aspect, the first tone spacing may be different from the second tone spacing. In another aspect, the first tone spacing may be an integer multiple of the second tone spacing. In another aspect, the first tone spacing may be a first integer multiple of a tone spacing of a nominal numerology and the second tone spacing may be a second integer multiple of the tone spacing of a nominal numerology. In another aspect, the subframe may include one or more gap symbols between the transmission of the control channel and the data channel. In another aspect, the one or more gap symbols may include reference signals or L1 control signals. In another aspect, the one or more gap symbols may use a same tone spacing as the control channel or may use a different tone spacing from the control channel. In another aspect, a first tone spacing of the control channel may be an integer multiple of a second tone spacing of the data channel, and the one or more gap symbols may have the first tone spacing.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
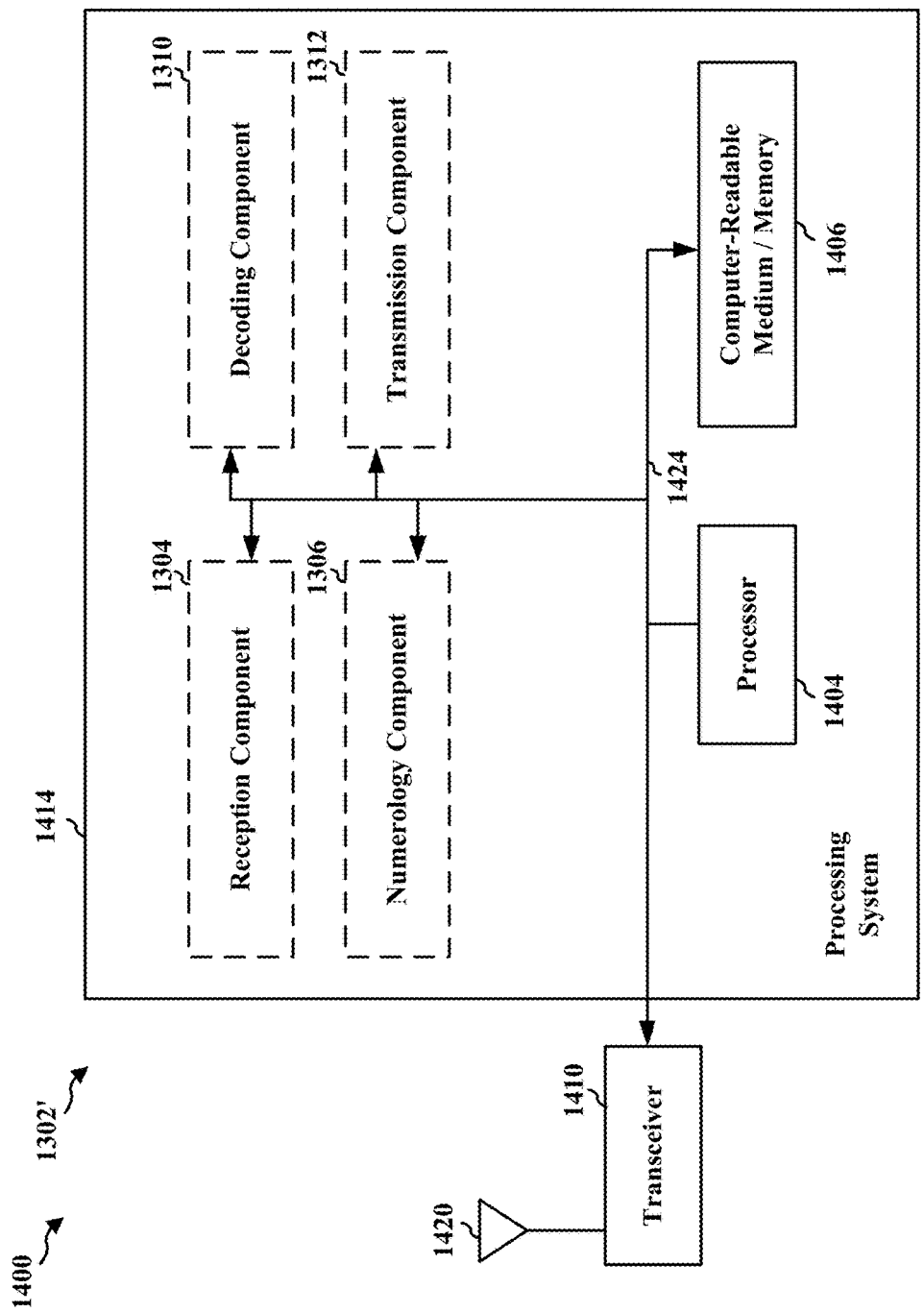
FIG. 14 is a diagram illustrating an example of a hardware implementation for an apparatus employing a processing system.

FIG. 14 is a diagram 1400 illustrating an example of a hardware implementation for an apparatus 1402' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for determining one or more fallback subframes and to determine a numerology configuration to be used for communicating with a base station within the one or more fallback subframes. The apparatus includes means for communicating with the base station within one or more fallback subframes based on the determined numerology configuration. In one instance, the apparatus may include means for receiving one or more signals from the base station indicating a second numerology configuration to be used for future communications with the base station. In an aspect, the reception of the one or more signals may take place within a subset of the one or more fallback subframes. In another aspect, the one or more signals may indicate at least one of a third numerology configuration to be used in a future subframe or indicates a fourth numerology configuration to be used in a future fallback subframe. In another aspect, the one or more signals may indicate a tone spacing for a symbol on which a control channel is to be transmitted in a future subframe. In another instance, the apparatus may include means for receiving an activation command indicating when the second numerology configuration is to take effect. In this instance, the apparatus may include means for transmitting an acknowledgment to the base station based on the received activation command. The apparatus may include means for receiving a set of subframes with the second numerology configuration after transmitting the acknowledgment. In an aspect, the one or more fallback subframes may be UE-specific, common to all UEs associated with the base station, or common to a subset of UEs associated with the base station. In another aspect, information associated with the one or more fallback subframes may be signaled in a MIB, a SIB, or in RRC signaling. In another aspect, the one or more fallback subframes may be pre-configured. In another aspect, the numerology configuration may be UE-specific, common to all UEs associated with the base station, or common to a subset of UEs associated with the base station. In another aspect, the numerology configuration may be signaled in a MIB, a SIB, or in RRC signaling. In another aspect, the numerology configuration may be pre-configured. In another aspect, the numerology configuration may be fixed, semi persistent (e.g., remains the same for a predetermined number of subframes) or changes dynamically.

In one configuration, the apparatus 1302/1302' for wireless communication includes means for receiving from the base station a subframe associated with a numerology configuration. The numerology configuration may be associated with a first tone spacing in the subframe for a control channel and a second tone spacing in the subframe for a data channel. The apparatus includes means for decoding the received subframe based on the numerology configuration. In an aspect, the first tone spacing may be the same as the second tone spacing. In another aspect, the first tone spacing may be different from the second tone spacing. In another aspect, the first tone spacing may be an integer multiple of the second tone spacing. In another aspect, the first tone spacing may be a first integer multiple of a tone spacing of a nominal numerology and the second tone spacing may be a second integer multiple of the tone spacing of a nominal numerology. In another aspect, the subframe may include one or more gap symbols between the transmission of the control channel and the data channel. In another aspect, the one or more gap symbols may include reference signals or L1 control signals. In another aspect, the one or more gap symbols may use a same tone spacing as the control channel or may use a different tone spacing from the control channel. In another aspect, a first tone spacing of the control channel may be an integer multiple of a second tone spacing of the data channel, and the one or more gap symbols may have the first tone spacing.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
   determining one or more fallback subframes having a first numerology configuration; and communicating with a user equipment (UE) within the one or more fallback subframes having the first numerology configuration, wherein communicating with the UE within the one or more fallback subframes having the first numerology configuration comprises:
transmitting one or more signals within the one or more fallback subframes having the first numerology configuration to indicate a second numerology configuration to be used for future communications with the UE, the second numerology configuration indicating respective symbol durations for different symbols transmitted in a future subframe, the future subframe being different than the one or more fallback subframes.

2. The method of claim 1, further comprising:
transmitting an activation command, by the base station, indicating when the second numerology configuration is to take effect;
receiving an acknowledgment from the UE based on the transmitted activation command; and
transmitting to the UE a set of subframes with the second numerology configuration after receiving the acknowledgment from the UE.

3. The method of claim 1, wherein the transmission of the one or more signals further indicates at least one of a third numerology configuration to be used in the future subframe or indicates a fourth numerology configuration to be used in a future fallback subframe.

4. The method of claim 1, wherein the transmission of the one or more signals indicates a tone spacing for a symbol on which a control channel is to be transmitted in a future subframe.

5. The method of claim 1, wherein the one or more fallback subframes are UE-specific, common to all UEs associated with the base station, or common to a subset of UEs associated with the base station, and wherein information associated with the one or more fallback subframes is signaled in a master information block (MIB), a system information block (SIB), or in radio resource control (RRC) signaling.

6. The method of claim 1, wherein the one or more fallback subframes are pre-configured, and wherein the first numerology configuration is pre-configured.

7. The method of claim 1, wherein the first numerology configuration is UE-specific, common to all UEs associated with the base station, or common to a subset of UEs associated with the base station, and wherein the first numerology configuration is fixed, semi persistent or changes dynamically.

8. The method of claim 1, wherein the first numerology configuration is signaled in a master information block (MIB), a system information block (SIB), or in radio resource control (RRC) signaling.

9. A method of wireless communication by a user equipment (UE), comprising:
determining one or more fallback subframes having a first numerology configuration; and
communicating with a base station within the one or more fallback subframes having the first numerology configuration, wherein communicating with the base station within the one or more fallback subframes having the first numerology configuration comprises:
receiving one or more signals from the base station within the one or more fallback subframes having the first numerology configuration, the one or more signals indicating a second numerology configuration to be used for future communications with the base station, the second numerology configuration indicating respective symbol durations for different symbols transmitted by the base station in a future subframe, the future subframe being different than the one or more fallback subframes.

10. The method of claim 9, wherein the one or more signals further indicates at least one of a third numerology configuration to be used in the future subframe or indicates a fourth numerology configuration to be used in a future fallback subframe.

11. The method of claim 9, wherein the one or more signals indicates a tone spacing for a symbol on which a control channel is to be transmitted in a future subframe.

12. The method of claim 9, further comprising:
receiving an activation command indicating when the second numerology configuration is to take effect;
transmitting an acknowledgment to the base station based on the received activation command; and
receiving a set of subframes with the second numerology configuration after transmitting the acknowledgment.

13. The method of claim 9, wherein the one or more fallback subframes are UE-specific, common to all UEs associated with the base station, or common to a subset of UEs associated with the base station, and wherein information associated with the one or more fallback subframes are signaled in a master information block (MIB), a system information block (SIB), or in radio resource control (RRC) signaling.

14. The method of claim 9, wherein the one or more fallback subframes are pre-configured, and wherein the first numerology configuration is pre-configured.

15. The method of claim 9, wherein the first numerology configuration is UE-specific, common to all UEs associated with the base station, or common to a subset of UEs associated with the base station, and wherein the first numerology configuration is signaled in a master information block (MIB), a system information block (SIB), or in radio resource control (RRC) signaling.

16. A base station for wireless communication, comprising:
a memory; and
at least one processor coupled to the memory, wherein the at least one processor is configured to:
determine one or more fallback subframes having a first numerology configuration; and
communicate with a user equipment (UE) within the one or more fallback subframes based on the first numerology configuration, wherein to communicate with the UE within the one or more fallback subframes based on the first numerology configuration, the at least one processor is configured to:
transmit one or more signals within the one or more fallback having the first numerology configuration to indicate a second numerology configuration to be used for future communications with the UE, the second numerology configuration indicating respective symbol durations for different symbols transmitted in a future subframe, the future subframe being different than the one or more fallback subframes.

17. The base station of claim 16, wherein the at least one processor is further configured to:
transmit an activation command, by the base station, indicating when the second numerology configuration is to take effect;
receive an acknowledgment from the UE based on the transmitted activation command; and transmit to the UE a set of subframes with the second numerology configuration after receiving the acknowledgment from the UE.

18. The base station of claim 16, wherein the transmission of the one or more signals further indicates at least one of a third numerology configuration to be used in the future subframe or indicates a fourth numerology configuration to be used in a future fallback subframe.

19. The base station of claim 16, wherein the one or more fallback subframes are UE-specific, common to all UEs associated with the base station, or common to a subset of UEs associated with the base station, and wherein information associated with the one or more fallback subframes is signaled in a master information block (MIB), a system information block (SIB), or in radio resource control (RRC) signaling.

20. A user equipment (UE) for wireless communication, comprising:
a memory; and
at least one processor coupled to the memory, wherein the at least one processor is configured to:
  determine one or more fallback subframes having a first numerology configuration; and
  communicate with a base station within the one or more fallback subframes based on the first numerology configuration, wherein to communicate with the base station within the one or more fallback subframes based on the first numerology configuration, the at least one processor is configured to:
    receive one or more signals from the base station within the one or more fallback subframes, the one or more signals indicating a second numerology configuration to be used for future communications with the base station, the second numerology configuration indicating respective symbol durations for different symbols transmitted by the base station in a future subframe, the future subframe being different than the one or more fallback subframes.

21. The UE of claim 20, wherein the one or more signals further indicates at least one of a third numerology configuration to be used in a future subframe or indicates a fourth numerology configuration to be used in a future fallback subframe.

22. The UE of claim 20, wherein the one or more signals indicates a tone spacing for a symbol on which a control channel is to be transmitted in a future subframe.

23. The UE of claim 20, further comprising:
receiving an activation command indicating when the second numerology configuration is to take effect;
transmitting an acknowledgment to the base station based on the received activation command; and
receiving a set of subframes with the second numerology configuration after transmitting the acknowledgment.

24. The UE of claim 20, wherein the one or more fallback subframes are UE-specific, common to all UEs associated with the base station, or common to a subset of UEs associated with the base station, and wherein information associated with the one or more fallback subframes are signaled in a master information block (MIB), a system information block (SIB), or in radio resource control (RRC) signaling.

25. The method of claim 1, wherein the first numerology configuration and the second numerology configuration are different.

26. The method of claim 1, wherein the first numerology configuration is the same as the second numerology configuration.

27. The method of claim 9, wherein the first numerology configuration and the second numerology configuration are different.

28. The base station of claim 16, wherein the first numerology configuration and the second numerology configuration are different.

29. The UE of claim 20, wherein the first numerology configuration and the second numerology configuration are different.

* * * * *